United States Patent
Osadchyy et al.

(10) Patent No.: US 9,772,807 B1
(45) Date of Patent: Sep. 26, 2017

(54) MULTI-WORKER APPROACH FOR PRINTER DATA COLLECTION IN TIMELY SITUATIONS

(71) Applicant: KYOCERA Document Solutions Inc., Osaka (JP)

(72) Inventors: Oleksandr Osadchyy, Concord, CA (US); Oleksandr Zinchenko, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/083,201

(22) Filed: Mar. 28, 2016

(51) Int. Cl.
- *G06F 3/12* (2006.01)
- *H04W 8/00* (2009.01)
- *H04L 12/24* (2006.01)

(52) U.S. Cl.
CPC .......... *G06F 3/1236* (2013.01); *G06F 3/1205* (2013.01); *G06F 3/126* (2013.01); *G06F 3/1293* (2013.01); *H04L 41/0213* (2013.01); *H04W 8/005* (2013.01)

(58) Field of Classification Search
None
See application file for complete search history.

(56) References Cited

U.S. PATENT DOCUMENTS

| | | | |
|---|---|---|---|
| 7,716,318 B2 | 5/2010 | Kaneko | |
| 2003/0005097 A1* | 1/2003 | Barnard | H04L 41/0253 709/223 |
| 2008/0180699 A1* | 7/2008 | Selvaraj | G06F 3/1204 358/1.1 |
| 2008/0180726 A1 | 7/2008 | Selvaraj | |
| 2010/0073712 A1* | 3/2010 | Cain | G06F 3/1204 358/1.15 |

OTHER PUBLICATIONS

R. Bergman et al., "Request for Comments: 3805—Printer MIB v2", Jun. 2004.
R. Bergman et al., "Request for Comments: 3806—Printer Finishing MIB", Jun. 2004.

(Continued)

*Primary Examiner* — Thomas D Lee
(74) *Attorney, Agent, or Firm* — McDonnell Boehnen Hulbert & Berghoff LLP

(57) ABSTRACT

Methods and apparatus for assessing printing devices are provided. A computing device can execute a first discovery technique to send discovery messages to connected devices that can include printing devices. The computing device can execute a second discovery technique different from the first discovery technique. The computing device can receive at least a first discovery response to the discovery messages. The computing device can execute the first discovery technique to identify a first device based on the first discovery response and determine whether the first device is a printing device. After determining the first device is a printing device, the computing device can execute the first discovery technique to determine whether the first device is a known printing device based on printing device information for the first device. After determining the first device is a known printing device, the computing device can provide an output assessing the first device.

20 Claims, 19 Drawing Sheets

(56) References Cited

OTHER PUBLICATIONS

Brother Industries, Ltd., "What is the difference between the toner cartridge and the drum unit?", Mar. 25, 2016.
Hewlett-Packard Development Company,"HP Color LaserJet Printers Color Access Control", Edition 1, Nov. 2005.
The Internet Society, "Printer MIB", May 22, 2014.
Kitware, "cmake—Cross-Platform Makefile Generator", Feb. 1, 2009.
R. Smith et al., "Request for Comments: 1759—Printer MIB", Mar. 1995.

* cited by examiner

| 510 IP Addresses | | |
|---|---|---|
| Device Name (Fig. 1A) | IP Address | Known/Unknown Status |
| Non-Printing Device 120 | xxx.xxx.xxx.001 | Unknown |
| Non-Printing Device 122 | xxx.xxx.xxx.002 | Unknown |
| Non-Printing Device 124 | xxx.xxx.xxx.101 | Unknown |
| Non-Printing Device 126 | xxx.xxx.xxx.102 | Unknown |
| Non-Printing Device 128 | xxx.xxx.xxx.003 | Unknown |
| Printing Device 130 | xxx.xxx.xxx.004 | Known |
| Non-Printing Device 140 | xxx.xxx.xxx.200 | Unknown |
| Printing Device 142 | xxx.xxx.xxx.201 | Unknown |

| 512 Sorted IP Addresses | | |
|---|---|---|
| Device Name (Fig. 1A) | IP Address | Known/Unknown Status |
| Non-Printing Device 120 | xxx.xxx.xxx.001 | Unknown |
| Non-Printing Device 122 | xxx.xxx.xxx.002 | Unknown |
| Non-Printing Device 128 | xxx.xxx.xxx.003 | Unknown |
| Printing Device 130 | xxx.xxx.xxx.004 | Known |
| Non-Printing Device 124 | xxx.xxx.xxx.101 | Unknown |
| Non-Printing Device 126 | xxx.xxx.xxx.102 | Unknown |
| Non-Printing Device 140 | xxx.xxx.xxx.200 | Unknown |
| Printing Device 142 | xxx.xxx.xxx.201 | Unknown |

FIG. 5A

110 Assessment Device

514 Assessment Report
Time: 2:37:01 PM
Device Information          Device Assessment

FIG. 5B

110 Assessment Device

514 Assessment Report
Time: 2:37:49 PM

| Device Information | Device Assessment |
|---|---|
| Device 120 (IP: xxx.xxx.xxx.001) | Not assessed. |
| Device 122 (IP: xxx.xxx.xxx.002) | Not assessed. |

110 Assessment Device

514 Assessment Report
Time: 2:38:33 PM

| Device Information | Device Assessment |
|---|---|
| Device 120 (IP: xxx.xxx.xxx.001) | Not assessed. |
| Device 122 (IP: xxx.xxx.xxx.002) | Not assessed. |
| Device 128 (IP: xxx.xxx.xxx.003) | Not assessed. |
| Device 130 (IP: xxx.xxx.xxx.004) | Printer Model xxxx: |

Color / B & W Ratio = 0%
    Color / B & W Toner Coverage Rates = 0% / 7%
    CMYK Cartridge Yields = 0 / 0 / 0 / 13320 pgs
    CMYK Drum Yields = 0 / 0 / 0 / 26400 pgs.
    Transfer Unit Yield: 48300 pgs.
        Est. Annual Usage: 10000 pgs.
        Est. Annual Toner / Power Costs: $300 / $100.
        Est. Total Operation Cost: $400.
        Est. Cost / User: $1.31

Device 124 (IP: xxx.xxx.xxx.101)     Not assessed.

FIG. 5F

110 Assessment Device

514 Assessment Report
Time: 2:39:27 PM

| Device Information | Device Assessment |
|---|---|
| Device 120 (IP: xxx.xxx.xxx.001) | Not assessed. |
| Device 122 (IP: xxx.xxx.xxx.002) | Not assessed. |
| Device 128 (IP: xxx.xxx.xxx.003) | Not assessed. |
| Device 130 (IP: xxx.xxx.xxx.004) | Printer Model xxxx: |

Color / B & W Ratio = 0%
    Color / B & W Toner Coverage Rates = 0% / 7%
    CMYK Cartridge Yields = 0 / 0 / 0 / 13320 pgs
    CMYK Drum Yields = 0 / 0 / 0 / 26400 pgs.
    Transfer Unit Yield: 48300 pgs.
        Est. Annual Usage: 10000 pgs.
        Est. Annual Toner / Power Costs: $300 / $100.
        Est. Annual Total Operation Cost: $400.
        Est. Annual Cost / User: $1.31

| Device 124 (IP: xxx.xxx.xxx.101) | Not assessed. |
|---|---|
| Device 126 (IP: xxx.xxx.xxx.102) | Not assessed. |
| Device 140 (IP: xxx.xxx.xxx.200) | Not assessed. |
| Device 142 (IP: xxx.xxx.xxx.201) | Printer Model yyyy: |

Color / B & W Ratio = 12.3%
    Color / B & W Toner Coverage Rates = 15% / 7%
    CMYK Cartridge Yields = 9000 / 8800 / 6600 / 10500 pgs
    CMYK Drum Yields = 28000 / 25000 / 32000 / 33300 pgs.
    Transfer Unit Yield: 42300 pgs.
        Est. Annual Usage: 50000 pgs.
        Est. Annual Toner / Power Costs: $1200 / $200.
        Est. Annual Total Operation Cost: $1400.
        Est. Annual Cost / User: $4.59

All Devices Discovered...
Grand Usage and Cost Totals:
    Est. Total Annual Printer Usage: 60000 pgs.
    Est. Total Annual Toner / Power Costs: $1500 / $300.
    Est. Total Annual Printer Operation Cost: $1800.
    Est. Annual Cost / User: $5.90

FIG. 5H

110 Assessment Device

610 Data Collection Tool

| 620 Settings | 622 Discovered Devices | 624 Assessment | 626 Data Export |

| Status 630 | Device Type 632 | Brand & Model Information 634 | IP Address 636 | Discovery Status 638 |
|---|---|---|---|---|
| ⚠ Warning | Known Printer | Brand 1 – Model xxx | 10.10.31.xxx | Data Collected |
| ○ Ready | Unknown Printer | Brand 2 – xxx Series | 10.191.1.xx | Data Collected |
| ⚠ Warning | Unknown Printer | Brand 3 – Cyyyy | 10.191.1.xy | Data Collected |
| ○ Ready | Unknown Printer | Brand 4 – Laser xxx Type | 10.191.1.yy | Data Collected |
| ⚠ Warning | Unknown Printer | Brand 5 – MFP xxx | 10.191.2.yyy | Data Collected |
| ○ Ready | Unknown Printer | Brand 3 – Cyyyy | 10.191.1.xz | Data Collected |
| ○ Ready | Unknown Printer | Brand 4 – Laser xxz Type | 10.191.3.xx | Data Collected |
| ○ Ready | Known Printer | Brand 1 – Model xxy | 10.191.1.yz | Data Collected |

⟳ Update Authentication    640

▼ Filter Results...    642

⏸ Pause Discovery    644

FIG. 6B

MULTI-WORKER APPROACH FOR PRINTER DATA COLLECTION IN TIMELY SITUATIONS

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

SUMMARY

In one aspect, a method is provided. A computing device executes a first discovery technique to send one or more discovery messages to one or more devices connected to the computing device. The one or more devices include one or more printing devices. The computing device is further configured to execute a second discovery technique, where the first discovery technique differs from the second discovery technique. The computing device receives one or more discovery responses to the one or more discovery messages. The one or more discovery responses include a first discovery response. The computing device executes the first discovery technique to identify a first device of the one or more devices based on the first discovery response. The computing device executes the first discovery technique to determine whether the first device is a printing device of the one or more printing devices. After determining that the first device is a printing device, the computing device executes the first discovery technique to determine whether the first device is a known printing device based on printing device information about the first device. After determining that the first device is a known printing device, the computing device provides an output that includes information assessing the first device.

In another aspect, a computing device is provided. The computing device includes one or more processors and data storage. The data storage is configured to store computer-readable instructions that, when executed by the one or more processors, cause the computing device to perform tasks. The tasks include: executing a first discovery technique to send one or more discovery messages to one or more devices connected to the computing device, where the one or more devices include one or more printing devices, where the computing device is further configured to execute a second discovery technique, and where the first discovery technique differs from the second discovery technique; receiving one or more discovery responses to the one or more discovery messages, where the one or more discovery responses include a first discovery response; executing the first discovery technique to identify a first device of the one or more devices based on the first discovery response; executing the first discovery technique to determine whether the first device is a printing device of the one or more printing devices; after determining that the first device is a printing device, executing the first discovery technique to determine whether the first device is a known printing device based on printing device information about the first device; and after determining that the first device is a known printing device, providing an output that includes information assessing the first device.

In another aspect, an article of manufacture is provided. The article of manufacture includes non-transitory data storage that is configured to store at least computer-readable instructions. The computer-readable instructions, when executed by one or more processors of a computing device, cause the computing device to perform tasks. The tasks include: executing a first discovery technique to send one or more discovery messages to one or more devices connected to the computing device, where the one or more devices include one or more printing devices, where the computing device is further configured to execute a second discovery technique, and where the first discovery technique differs from the second discovery technique; receiving one or more discovery responses to the one or more discovery messages, where the one or more discovery responses include a first discovery response; executing the first discovery technique to identify a first device of the one or more devices based on the first discovery response; executing the first discovery technique to determine whether the first device is a printing device of the one or more printing devices; after determining that the first device is a printing device, executing the first discovery technique to determine whether the first device is a known printing device based on printing device information about the first device; and after determining that the first device is a known printing device, providing an output that includes information assessing the first device.

Other aspects, embodiments, and implementations will become apparent to those of ordinary skill in the art by reading the following detailed description, with reference where appropriate to the accompanying drawings.

BRIEF DESCRIPTION OF THE FIGURES

FIGS. 5A-5H illustrate a scenario for assessing devices in the printing network of FIG. 1, according to an example embodiment.

FIGS. 6A-6D illustrate another scenario for assessing devices in a printing network, according to an example embodiment.

DETAILED DESCRIPTION

Figure 1A:
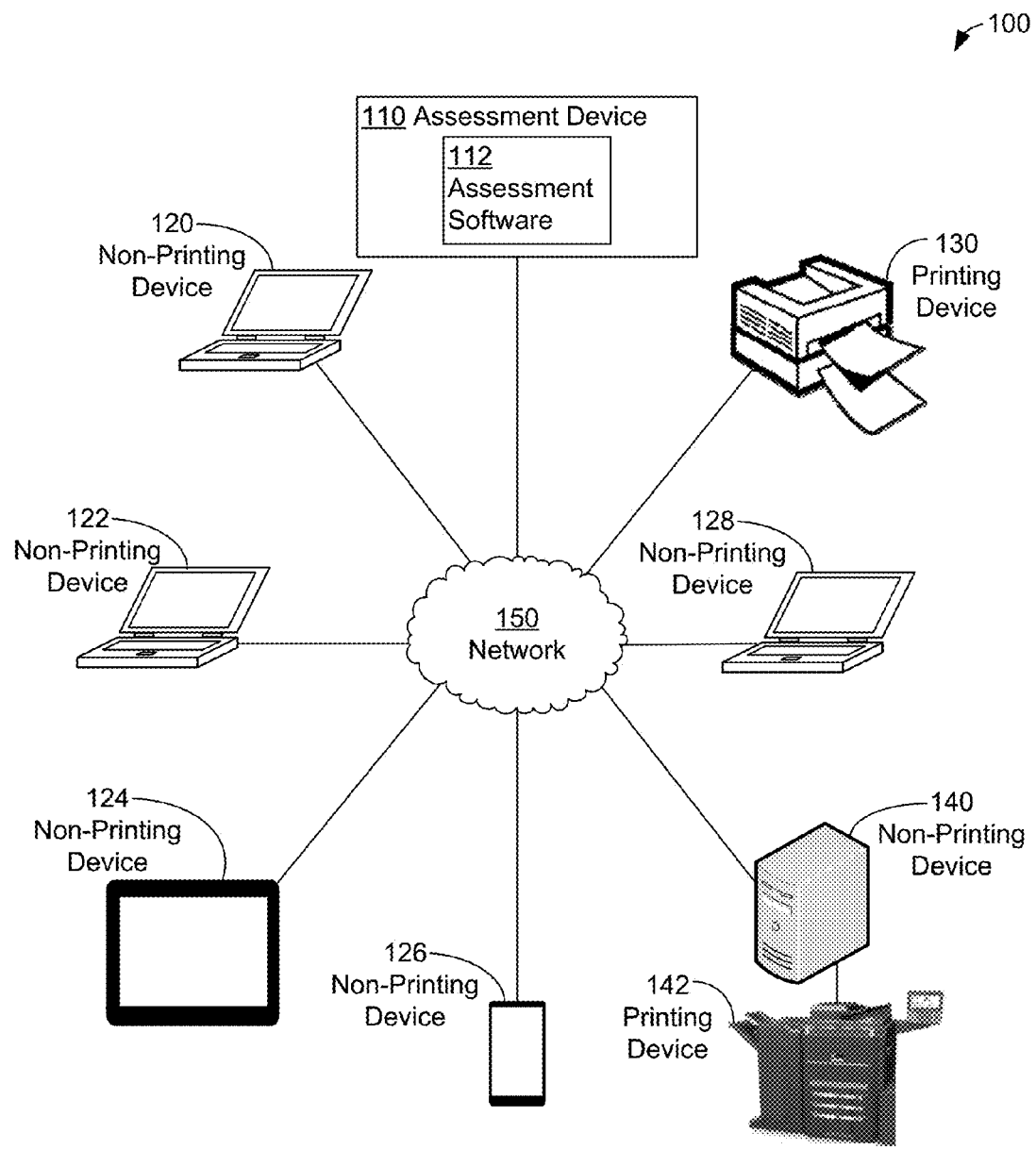
FIG. 1A is a diagram illustrating a printing network, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example apparatus and methods are described herein relate to collection of data, such as device-status data, from plurality of printing devices connected using a common network. The collected data can then be rapidly assessed and reported.

Assessments of printing networks can be used to support sales efforts, which often include relatively short visits to a potential customer's location. Some assessment techniques utilize a device status agent in a monitoring system operating in the background. The device status agent can be launched in a customer local network, discover devices, and collect properties and meters for printers, MFPs and copiers. However, due to the background nature of monitoring systems, data collection time is often takes longer than acceptable for situations where time is of the essence, such as making a sale of a new product or service. Combining device status agents can speed data collection, but still may not lead to timely collection of data.

Other relatively-quick systems exist for data collection during an initial visit to the potential customer location. These systems can rely upon data provided by the customer to assess printing networks; for example, the inputted data can be obtained via an interview and/or one or more sources of general product information. However, these relatively-quick systems do not involve comprehensive data collection as found in device status monitoring systems. That is, the inputted data is not collected directly from printing devices. In most if not all cases, these relatively-quick systems are not as accurate as device status monitoring systems. For example, a customer may provide an incorrect input or product information may not contain specific device information but rather a generalized manufacturer or market data, and so lead to an inaccurate assessment.

Privacy is yet another requirement during sales meetings; the customer often wants to review the data being collected before sharing the data with an outside party, such as a salesperson. Some assessment systems present users with a table-like view on the bulk of collected data at the end of collection. This bulk presentation of data often requires time for customer review prior to granting consent to share the data.

To address these concerns, a transient data-collection application, perhaps temporarily hosted on a customer's computing device, can embody some or all of the herein-described techniques. In particular embodiments, the transient data-collection application can be e-mailed or otherwise provided to a customer (e.g., downloaded via the internet using a link provided in the e-mail) and quickly installed on the customer's computing device.

The transient data-collection application can provide transparent discovery of devices by providing a review by the user of discovered devices as the devices are being discovered. The transient data-collection application can collect data in a transparent fashion; that is, display most, if not all, data as the data is being collected. The transient data-collection application can have an interface that enables licensing of software and/or services, such as subscription cloud services, related to the transient data-collection application. In some embodiments, the transient data-collection application can export part or all of the collected data in one or more formats; e.g., as a spreadsheet, as text, as formatted text such as comma-separated values, as a word-processing document, etc.

The transient data-collection application can discover, collect, display, and export printer-related data in the foreground, thereby working faster than device status agents of a monitoring system. Thus, the herein described techniques can be executed in a timely fashion, allowing for rapid assessment of networked printing devices. For example, these techniques can include a data-collection application and/or an assessment process that quickly assesses one or more printing devices, perhaps during an initial contact at a customer location. Data collected from printing devices and generated assessment reports can be displayed shortly after collection and/or generation, thereby providing transparency into and increasing trust in the data-collection application and/or assessment process. Further, by generating assessment reports from recently-collected data, these assessment reports can be based on the most up-to-date data, minimizing or eliminating issues with data staleness and time-related data inconsistencies. The herein-described techniques can provide timely and accurate assessments of printing networks, enabling printing device and printing service customers to make informed decisions using these timely and accurate assessments.

II. Printing System Examples

FIG. 1A is a diagram illustrating printing network 100, according to an example embodiment. Printing network 100 includes assessment device 110, one or more non-printing devices 120, 122, 124, 126, 128, 140 and one or more printing devices (PDs) 130, 142 interconnected using network 150. In some examples, printing network 100 can have more, fewer, and/or different types of assessment devices, non-printing devices, and/or printing devices than indicated in FIG. 1.

Assessment device 110 and/or non-printing devices 120, 122, 124, 126, 128 can be or include computing devices configured to communicate with each other and with printing devices 130, 142 using network 150. Assessment device 110 can be a printing or non-printing device that includes assessment software 112. Assessment software 112 can discover, collect, display, and export printer-related data from printing device(s) connected to assessment device 110; e.g., connected to assessment device via network 150 and/or other network(s). In some embodiments, assessment software 112 can be part or all of a data-collection application, such as a transient data-collection application that can be temporarily hosted on a computing device; e.g., hosted for the duration of a sales call or other visit to a customer location.

Printing devices 130, 142 can include devices configured to scan, print, copy, e-mail, account for, communicate and/or otherwise process documents and/or files that are originally available either on paper or electronically. In printing network 100, a non-printing device can be a computing device that is not a printing device, where the non-printing device can be configured to communicate with other non-printing devices and with printing devices 130, 142 using network 150.

After processing by one or more of printing devices 130, 142, the documents and/or files can be subsequently available either on paper or electronically, as requested. That is, printing devices 130, 142 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 130, 142 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 130, 142 can perform other tasks and/or other processing as well. Printing devices 130, 142 can include products from various manufacturers with variations in color, speed, computing power, functionality, network connectivity, and/or other features.

In an example embodiment, some or all printing devices 130, 142 can be connected to network 150 through one or more, possibly different, network protocols. Data can be transmitted between printing devices 130, 142, non-printing devices 120, 122, 124, 126, 128, 140 over wired and/or wireless links between non-printing devices, printing devices, and network 150. The format of each respective data transmission between devices in printing network 100 can include one or more of a variety of different formats including: text formats, image formats, extensible mark-up language (XML), database tables, a flat file format, or another format. In some embodiments, a non-printing device can be configured to act as a print server for one or more printing devices. A print server can be configured to process jobs (e.g., spool job-related data, route jobs, provide user and/or server-related accounting for jobs, verify/enforce authentication and authorization rules related to jobs) and store data related to printing devices in printing network 100. For example, in network 140, non-printing device 140 is configured to be a print server for at least printing device 142.

Communications between the non-printing devices, and printing devices can include: assessment device 110 and/or non-printing devices 120, 122, 124, 126, 128, 140 sending data for print jobs and/or print job portions for printing to printing devices 130, 142 and printing devices 130, 142 sending alert, status, error, and/or other messages to inform other devices about error or other conditions of the printing devices; e.g., idle, printing, sleeping, paper jam, low or out of paper, low or out of toner/ink, etc. Other communications between one or more assessment devices, one or more non-printing devices, and one or more printing devices are possible as well; e.g., the communications described below related to assessment software 112.

Figure 1B:
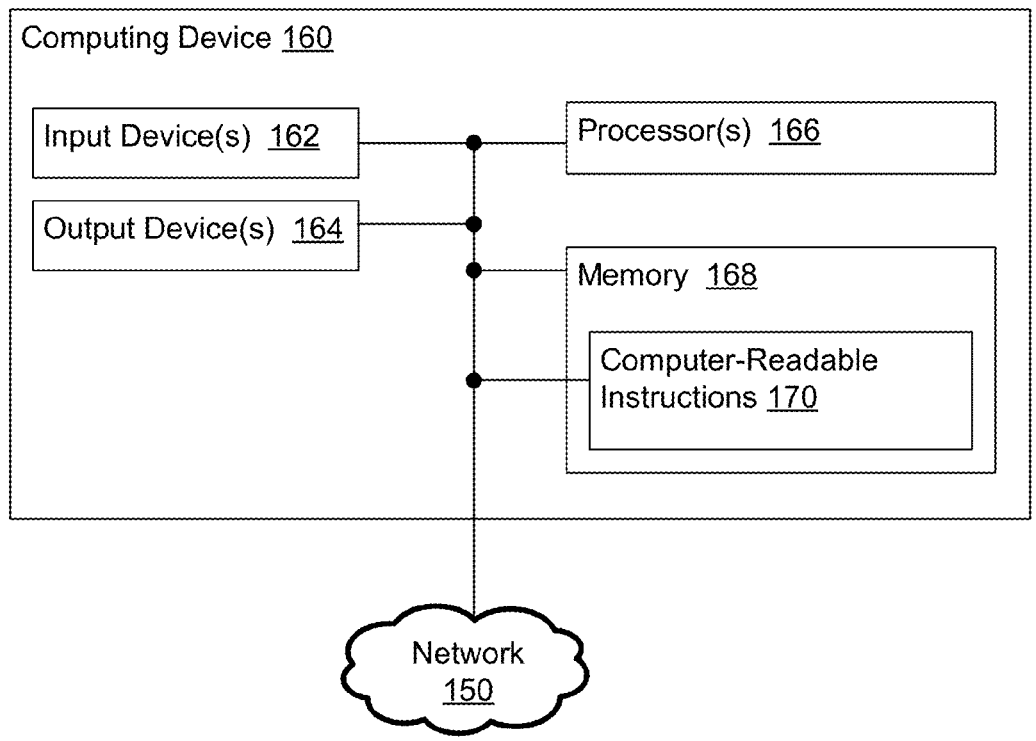
FIG. 1B is a schematic block diagram illustrating a computing device, according to an example embodiment.

FIG. 1B is a schematic block diagram illustrating computing device 160, according to an example embodiment. In some embodiments, computing device 160 can be configured to perform one or more herein-described functions of: printing network 100, assessment device 110, non-printing devices 120, 122, 124, 126, 128, 140, printing devices 130, 142, methods 200, 430, 700, assessment server 612, assessment software 112 including but not limited to functionality of IP address discovery software 310, assessment discovery software 320, thread manager 322, status monitoring discovery software 330, status monitoring data collection software 332, assessment data collection software 334, device training software 340, job manager 410, device processing software 420, and data collection tool 610, as well as at least part of the herein-described functionality related to scenarios 500 and 600.

Computing device 160 can include one or more input devices 162, one or more output devices 164, one or more processors 166 and memory 168. Input devices 162 can include user input devices, network input devices, sensors, and/or other types of input devices. For example, input devices 162 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Sensors can include devices configured to measure conditions in an environment of computing device 160 and provide data about that environment, such data including, but not limited to, location data, velocity (speed, direction) data, acceleration data, and other data about the environment for computing device 160. Example sensors include, but are not limited to, GPS sensor(s), location sensors(s), gyroscope(s), accelerometer(s), magnetometer(s), camera(s), light sensor(s), infrared sensor(s), and microphone(s). Other input devices 162 are possible as well.

Output devices 164 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 150, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 150. Other types of output devices can include, but are not limited to, vibration devices, haptic feedback devices, and non-visible light emission devices; e.g., devices that emit infra-red or ultra-violet light. Other output devices 164 are possible as well.

Processors 166 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 166 can be configured to execute computer-readable program instructions 170 that are contained in memory 168 and/or other instructions as described herein.

Memory 168 can include non-transitory machine-readable storage configured to store data and/or instructions. In particular, memory 168 can store machine-readable instructions 170 that, when executed by processor(s) 166, can cause a computing device to perform herein-described functions, such as but not limited to, functions of herein-described devices, networks, methods, features, and scenarios. In some embodiments, computer-readable program instructions 170 can include at least some instructions for and/or related to assessment software 112.

III. Apparatus and Methods for Printer Data Collection in Timely Situations

To collect data from one or more networked printing devices, such as printing devices 130, 142 in printing network 140, an assessment device executing assessment software, such as assessment device 110 executing assessment software 112, can first discover the printing device(s). Once discovered, the assessment software can verify and recognize the printing device as either a "known" printing device or an "unknown" printing device. A known printing device is a printing device that the assessment software is configured to assess using a particular discovery techniques and to collect data using one or more collection techniques. An unknown printing device is a printing device that the assessment software is not configured to assess using the particular discovery technique and so has to rely on other discovery techniques to assess the unknown printing device. In some embodiments, the assessment software can classify or otherwise determine whether a device as either a known printing device, an unknown printing device, or a potential unknown device. In some of these embodiments, a potential unknown device can be considered to be non-printing device.

Recognition of a device can include assigning a discovery status to the device, where the discovery status can be one of a known printing device, an unknown printing device, a potential unknown device, and perhaps other status (es). After the printing device is verified and recognized, data collection for the printing device can be started.

Assessment of a network of devices that include both printing and non-printing devices can be performed using an assessment device that includes assessment software that can include both multiple discovery engines embodying discovery techniques and multiple collection engines embodying collection techniques. Discovery engines can search for devices connected to the assessment device, perhaps via a printer network, and classify the devices as known printing devices, unknown printing devices, or (potential) unknown devices. For example, one discovery engine can classify a device as a printing device or an unknown device, and another discovery engine can classify potential unknown devices.

In some embodiments, known printing devices can have a higher priority than unknown printing devices, and unknown printing devices can have a higher priority than unknown printing devices. For example, known printing devices can have higher priority than unknown printing devices, because known printing devices can be assessed faster and/or assessed using fewer resources than unknown printing devices. In this example, unknown printing devices can have higher priority than potentially unknown devices since assessment results of printing devices are requested before any assessment of non-printing devices. Further, there is no guarantee that a potentially unknown device is to be assessed as a printing device and so resources can be first allocated to printing devices. In particular of these embodiments, potentially unknown devices can have priority over unclassified devices; e.g., a device only known via an Internet Protocol (IP) or other addresses, as discovery and the data collection speed can be reduced by the tail of potentially unknown devices left until the very end of assessment processing.

Collection engines can obtain data from (printing) devices—for example, one collection engine can obtain data from classified known printing devices and another collection engine can obtain data from unknown printing devices. This data can be displayed, shortly after collection, using a user interface provided by assessment software 112. Data that can be collected and/or displayed for one or more printing devices found in a printing network, such as printing network 100, and corresponding example user interfaces are listed in Table 1 below.

TABLE 1

| User Interface | Related Collected and/or Displayed Data |
|---|---|
| Summary View | Brand (i.e., manufacturer) information for the printing device(s) |
| | Total page counts, including black and white and/or color page counts for the printing device(s) |
| | Indications of whether (or not) the printing device(s) can print in color |
| | Total amounts of consumables (toner, ink, etc.) used by the printing device(s) |
| | Total amounts of consumables by type/color (black, cyan, magenta, yellow, etc.) used by the printing device(s) |
| | Total and/or average page counts for each manufacturer of the printing device(s) |
| | Total numbers of printing devices that can print in color for each manufacturer of the printing device(s) |
| | Total average consumables used for each manufacturer of the printing device(s) |
| | Total average amounts of consumables used according to consumable type/color for each manufacturer of the printing device(s) |
| | Printing device distribution by brand |
| General View | Printing device status (e.g., ready, warning, error, offline) |
| | Printing device networking information: IP and/or Media Access Layer (MAC) addresses, printing device network and/or host name, etc. |
| | Printing device manufacturer and/or model names |
| | Printing device serial and/or asset numbers |
| | Printing device type (e.g., Printer, Printer/Scanner, Multi-Function Printer) |
| | Printing device manufacturing date |
| | Printing device location information |
| | Color(s) supported by the printing device |
| | Printing device speed (e.g., pages per minute) |
| | Printing device resources: free and maximum temporary memory sizes (i.e., RAM), free and maximum permanent storage sizes (i.e., hard disk, solid state) size, free and maximum memory card sizes, etc. |
| | Printing device panel message(s) |
| | Printing device power options: sleep timer (e.g., in seconds or minutes), low power timer (e.g., in seconds or minutes), system up time, sleep level (e.g., energy saver, quick recovery) |
| | Printing device data collection log providing information about properties collection process |

TABLE 1-continued

| User Interface | Related Collected and/or Displayed Data |
|---|---|
| | Additional capabilities of the printing device: duplex unit, scan unit, fax unit, stapler unit, punch unit, address book features, document box features, user list features, job log features, input trays, output trays, etc. |
| Alerts view | Printing device status |
| | Printing device networking information: IP and/or MAC addresses, printing device network and/or host name, etc. |
| | Printing device manufacturer and/or model names |
| | Printing device serial and/or asset numbers |
| | Detailed information about alerts for the printing device |
| Counters view | Printing device status |
| | Printing device networking information: IP and/or MAC addresses, printing device network and/or host name, etc. |
| | Printing device manufacturer and/or model names |
| | Printing device serial and/or asset numbers |
| | Printing device B&W (black and white) and color page counters |
| | Printing device function based counters |
| | Printing device scanned page counters |
| | Printing device paper size based counters |
| | Printing device duplex counters |
| | Printing device total counters |
| | Printing device multi-page per sheet counters |
| | Printing device color level counters |
| | Printing device life counter |
| Toners view | Printing device status |
| | Printing device networking information: IP and/or MAC addresses, printing device network and/or host name, etc. |
| | Printing device manufacturer and/or model names |
| | Printing device serial and/or asset numbers |
| | Printing device black toner capacity, level, and/or model |
| | Printing device cyan toner capacity, level, and/or model |
| | Printing device magenta toner capacity, level, and/or model |
| | Printing device yellow toner capacity, level, and/or model |
| | Printing device waste toner box level |
| Firmware versions view | Printing device status |
| | Printing device networking information: IP and/or MAC addresses, printing device network and/or host name, etc. |
| | Printing device manufacturer and/or model names |
| | Printing device serial and/or asset numbers |
| | Printing device system firmware version(s) |
| | Printing device engine firmware version(s) |
| | Printing device scanner firmware version(s) |
| | Printing device fax system firmware version(s) |
| | Printing device panel firmware version(s) |
| | Printing device network interface card (NIC) firmware version(s) |
| Job log view | Printing device status |
| | Printing device networking information: IP and/or MAC addresses, printing device network and/or host name, etc. |
| | Printing device manufacturer and/or model names |
| | Printing device serial and/or asset numbers |
| | Detailed job log information |
| | Number of users of the printing device |
| | Number of job types (based on file extension) printed by the printing device |
| | Printing device jobs in this month |
| | Printing device jobs in previous month |
| Event log view | Printing device status |
| | Printing device networking information: IP and/or MAC addresses, printing device network and/or host name, etc. |
| | Printing device manufacturer and/or model names |
| | Printing device serial and/or asset numbers |
| | Information for log(s); e.g., service call log, maintenance log, unknown toner log, error count log, paper jab logs |
| | Event log blob / text page from CC/CCRX |
| | Event log entries (e.g., using SOAP) |
| Management Interface Base (MIB) view | MIB tree and/or related data obtained from one or more printing devices |
| Other view(s) | Printing device status |
| | Printing device networking information: IP and/or MAC addresses, printing device network and/or host name, etc. |
| | Printing device manufacturer and/or model names |
| | Printing device serial and/or asset numbers |
| | Parts wear level and/or service kit information for printing device |
| | Printing device type (e.g., Printer, Printer/Scanner, Multi-Function Printer) |
| | Printing device sharing data |
| | Printing device installation date |
| | Printing device inventory date |
| | Printing device department/organization |
| | Printing device desk |
| | Printing device description |
| | Number of users served by printing device |

Figure 2:
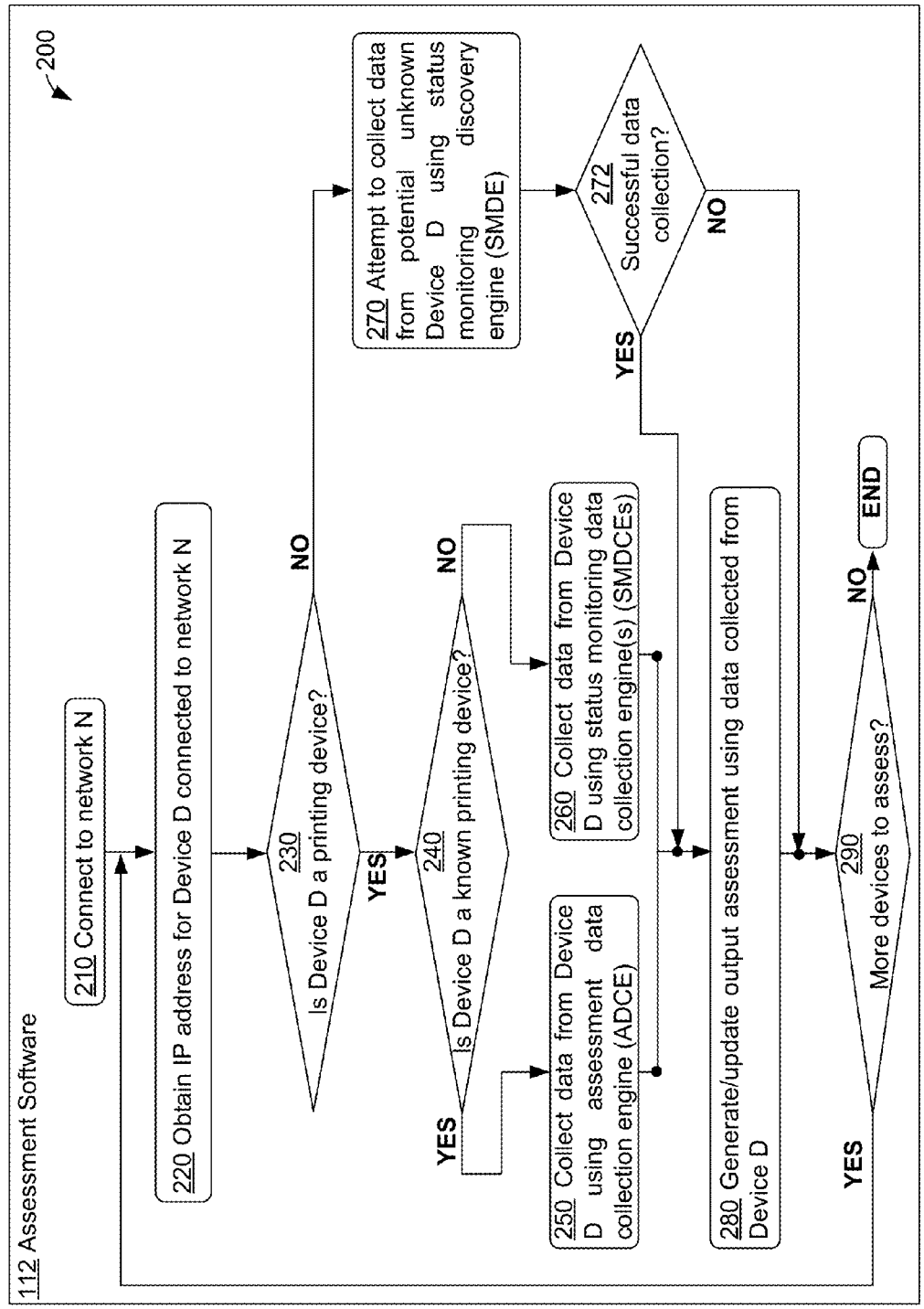
FIG. 2 is a flowchart for a method related to assessment software, according to an example embodiment.

FIG. 2 is a flowchart for a method 200 related to assessment software, according to an example embodiment. In particular, method 200 relates to printing device discovery and data collection for assessment using multiple different collection and discovery engines. Method 200 can be implemented as assessment software 112 executed/executable by assessment software 110.

As indicated by FIG. 2, method 200 begins at block 210, where assessment software 112 can connect to a printing network N.

At block 220, assessment software 112 can obtain an IP address and/or other network-identification information about device D connected to printing network N.

At block 230, assessment software 112 can determine whether device D is a printing device. Assessment software 112 can use an assessment discovery engine to determine whether device D is a printing device and/or whether a printing device is a known printing device or an unknown printing device. The assessment discovery engine can include one or more discovery sub-engines, some or all of which can use a relatively fast discovery technique supporting a limited number of printing devices. Then, the assessment discovery engine can use the discovery sub-engines to attempt to obtain identification information, such as manufacturer name, model name, and perhaps additional information, about the printing device; that is, device D can be considered to be a known printing device if the assessment discovery engine can obtain the identification information. In some cases, if the assessment discovery engine is unable to obtain the identification information, identification information about device D can be obtained from another source, such as a customer interview, via a link or other reference to a system containing product information that can be used to identify device D.

In some embodiments, assessment software 112 can send one or more discovery messages to device D. The discovery messages can utilize one or more particular protocols, such as the Simple Network Maintenance Protocol (SNMP) or another protocol. The SNMP protocol includes the use of GET messages to request information and the use of Get-Response Protocol Data Units (PDUs) to respond to GET messages. In particular embodiments, the discovery message(s) can be one or more SNMP GET messages requesting information that indicate device D is a printing device. For example, device D can support SNMP generally and one or more MIBs related to printing devices specifically; e.g, one or more printer MIBs specified in Request for Comments (RFC) 1759, RFC 3805, RFC 3806, and/or other documents. Then, assessment software 112 can send one or more discovery messages, such as SNMP GET messages, to request information that is specified in the printer MIB.

Subsequently, assessment software 112 can determine whether or not device D was a printing device based on one or more responses to the discovery messages. In response to the discovery messages, a printing device can provide one or more responses, such as SNMP GetResponse Protocol Data Units (PDU) responding to SNMP GET messages, with the requested information; e.g., information from the printer MIB. However, a non-printing device may fail to respond to the one or more discovery/GET messages and/or provide responses to the discovery/GET messages indicating the requested information is unavailable/unspecified. In other embodiments, the one or more discovery messages and/or the one or more responses can use one or more protocols other than SNMP. In response to assessment software 112 determining that device D is a printing device, assessment software 112 can proceed to block 240 of method 200. However, in response to assessment software 112 determining that device D is not a printing device, assessment software 112 can determine device D is a potential unknown device and proceed to block 270 of method 200.

At block 240, assessment software 112 can determine whether device D, identified at block 230 as a printing device, is a known printing device. For example, assessment software 112 can request printing device information, such as but not limited to the above-mentioned identification information, from device D. If the printing device information indicates that printing device D is a device that assessment software 112 can identify (or "know"), assessment software 112 can use a first (fast) data collection technique to obtain data for assessing the printing device. The requested identification information can be and/or relate to manufacturer, model, and/or other information about device D that identifies device D as a known printing device.

In response to the request(s) for identification information, printing device D can generate and send one or more responses to assessment software 112, where the response(s) may include the identification information. Assessment software 112 can then receive the response(s) and determine whether or not printing device D is a known printing device based on the response(s) and/or the identification information.

In response to assessment software 112 determining that printing device D is a known printing device, assessment software 112 can proceed to block 250 of method 200. However, in response to assessment software 112 determining that device D is not a known printing device, assessment software 112 can determine device D is an unknown printing device and proceed to block 260 of method 200.

In some embodiments, the procedures of at least blocks 230 and/or 240 can be used as a first discovery technique to determine whether a device D associated with the IP address obtained at block 220 is either: (a) a known printing device, (b) an unknown printing device, or (c) a potential unknown device. In still other embodiments, the procedures of at least blocks 230 and 240 can be merged; that is, assessment software 112 can receive an IP address and/or other network-identification information about device D obtained at block 220 and responsively determine, perhaps using the assessment discovery engine, whether device D is either: (a) a known printing device, (b) an unknown printing device, or (c) a potential unknown device.

At block 250, assessment software 112 can collect data from device D, identified at block 240 as a known printing device, using the first (fast) data collection technique. For example, the first data collection technique can be embodied in an assessment data collection engine (ADCE). Assessment software 112 can use the assessment data collection engine to collect assessment data from known printing device D for use in assessing known printing device D. The assessment data collection engine can represent and/or include multiple assessment data collection sub-engines, each using a relatively fast collection technique supporting a limited number of known printing devices. In some cases, if the assessment data collection engine is unable to obtain assessment data for assessing known printing device D, the assessment data can be obtained from another source, such as a customer interview, via a link or other reference to a system containing assessment data that can be used to identify device D. Upon completion of block 250, assessment software 112 can proceed to block 290 of method 200.

At block 260, assessment software 112 can collect data from device D, identified at block 240 as an unknown printing device, using a second data collection technique other than the first data collection technique. For example, the second data collection technique can be embodied in a status monitoring data collection engine (SMDCE). The status monitoring data collection engine can differ from the assessment data collection engine discussed above with respect to block 250. The status monitoring data collection engine can represent and/or include one or more discovery sub-engines, which collectively can provide a wide range of possible status monitoring data collection procedures and can use a combination of different data collection techniques and protocols. The status monitoring data collection engine can support a full range of printing devices.

The assessment data collection engine can be relatively faster than the status monitoring data collection engine, for at least the reason that the assessment data collection engine is operating with known printing devices. For example, identification information gathered at blocks 230 and/or 240 about a known printing device KPD can include information that enables the assessment data collection engine to select a particular assessment data collection sub-engine to collect assessment data from known printing device KPD. In some cases, the assessment data collection engine can have assessment data collection sub-engines that can be selected using identification information for a known printing device; e.g., identification information such as manufacturer and/or model name information. Then, the assessment data collection engine can quickly select the sub-engine associated with known printing device KPD and collect assessment data from KPD using the selected sub-engine.

However, the status monitoring data collection engine can take a relatively long amount of time in comparison to the time taken by the assessment data collection engine, perhaps as the status monitoring data collection engine does not have identification information that identifies unknown printing device UPD. In this case, the status monitoring data collection engine can select and use a first status monitoring data collection sub-engine in an attempt to collect the assessment data from UPD—if the first sub-engine succeeds in collecting the assessment data from UPD, then the status monitoring data collection engine can stop attempting to collect assessment data from UPD; otherwise, the status monitoring data collection engine can select another status monitoring data collection sub-engine to attempt to collect assessment data from UPD and repeat the attempt. Attempts to collect assessment data from UPD can then continue until either the status monitoring data collection engine collects the assessment data from UPD or the status monitoring data collection engine has unsuccessfully tried using all available status monitoring data collection sub-engines to collect the assessment data from UPD.

Using the status monitoring data collection engine, assessment software 112 can collect data from unknown printing device D for use in assessing unknown printing device D. Upon completion of block 260, assessment software 112 can proceed to block 290 of method 200.

At block 270, assessment software 112 can attempt to discover device D, identified at block 230 as a potential unknown device, using a second discovery technique other than first discovery technique; i.e., the discovery technique of at least blocks 230 and 240. For example, the second discovery technique can be embodied in a status monitoring discovery engine (SNIDE), which can differ from the assessment discovery engine discussed above in the context of blocks 230 and 240.

The status monitoring discovery engine can represent and/or include a wide range of status monitoring discovery sub-engines, where each status monitoring discovery sub-engine can use a combination of one or more discovery techniques, protocols and sequences to discover all possible printing devices in local and remote networks. Because of the nature of these status monitoring discovery sub-engines, their (cumulative) discovery time can be relatively slow in comparison to the techniques used by the assessment discovery engine discussed above regarding block 230. For example, the assessment discovery engine can use information, such as information provided in response to discovery messages, to select an assessment discovery sub-engine related to a (known) printing device in an analogous fashion as discussed above for the assessment data collection engine. However, the status monitoring discovery engine can take a relatively long amount of time in comparison to the time taken by the assessment discovery engine for at least analogous reasons to those discussed above for comparing amounts of time taken between the status monitoring data collection engine and assessment data collection engine.

Using the status monitoring discovery engine, assessment software 112 can collect data from unknown printing device D for use in identifying and/or assessing unknown printing device D. Upon completion of block 270, assessment software 112 can proceed to block 272 of method 200.

At block 272, assessment software 112 can determine whether or not data was successfully collected at block 270 from potential unknown device D, as identified at block 230. Assessment software 112 can determine that data collection carried out at block 270 was successful by determining that any data collected at block 270 enables assessment software 112 to assess potential unknown device D as a printing device. Otherwise, assessment software 112 can determine that the data collection carried out at block 270 was unsuccessful.

In response to assessment software 112 determining that data collection for potential unknown device D is successful, assessment software 112 can proceed to block 280 of method 200. However, in response to assessment software 112 determining that data collection for potential unknown device D is unsuccessful, assessment software 112 can proceed to block 290 of method 200.

At block 280, assessment software 112 can generate and/or update an assessment of device D using data collected about device D at block 250, block 260, or block 270. Example assessments of printing devices are shown below in the context of FIGS. 5B-6D.

At block 290, assessment software 112 can determine whether or not there are additional devices to be assessed. If assessment software 112 determines that there are additional devices to be assessed, assessment software 112 can proceed to block 220 of method 200. Otherwise, if assessment software 112 determines that there are no additional devices to be assessed, method 200 can end.

Figure 3A:
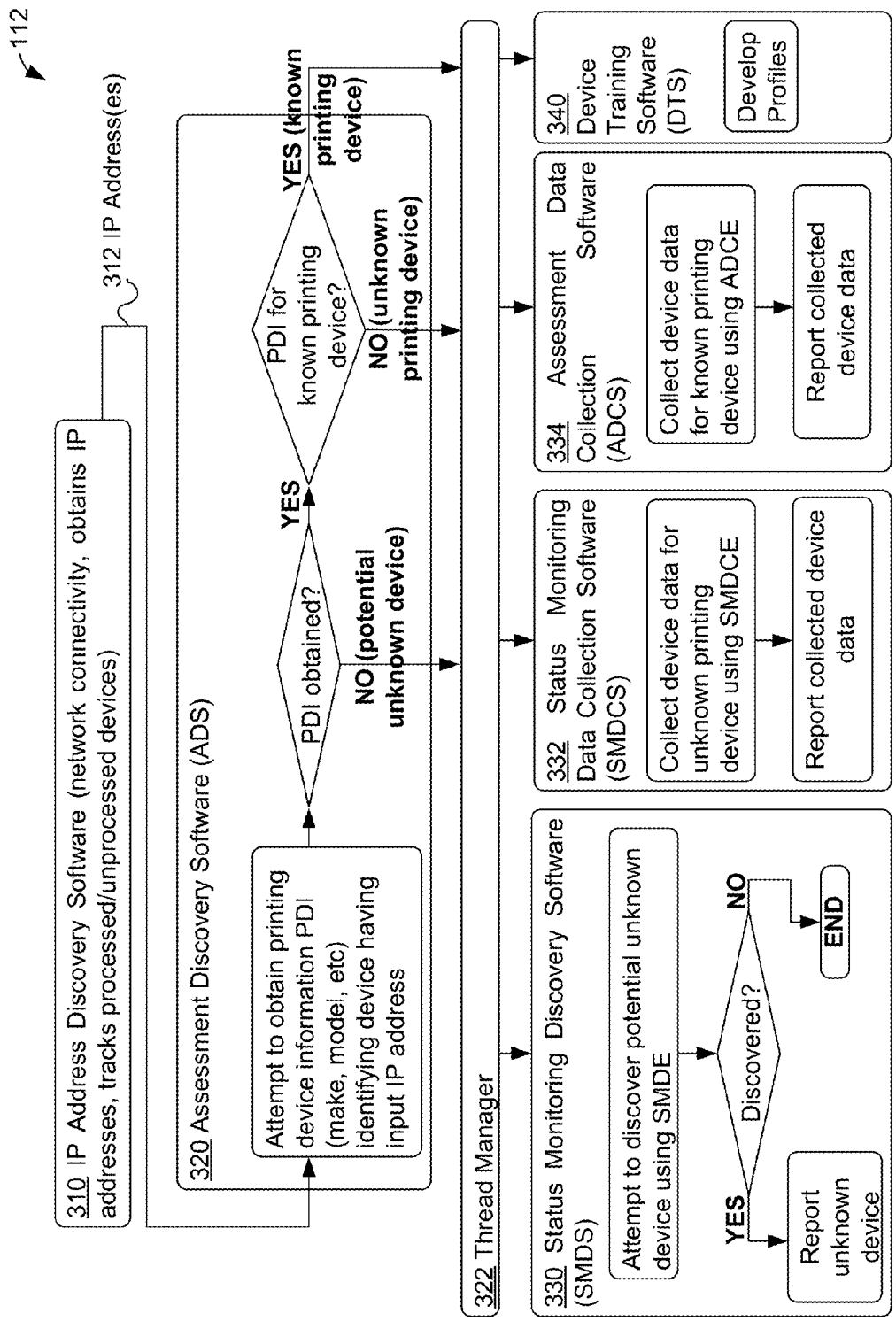
FIG. 3A is a diagram illustrating execution flow of device discovery and data collection threads, according to an example embodiment.

FIG. 3A is a diagram illustrating execution flow of device discovery and data collection threads, according to an example embodiment. As shown in FIG. 3A, assessment software 112 can include components for device discovery and data collection, such as IP address discovery software 310, assessment discovery software 320, thread manager 322, status monitoring discovery software (SDMS) 330, status monitoring data collection software (SMDCS) 332, assessment data collection software (ADCS) 334, and device training software (DTS) 340.

IP address discovery software 310 can enable connection to a network, such as network 100 and/or network 150. After connecting to the network, IP address discovery software 310 can attempt to obtain IP addresses of other devices connected to the network and provide any obtained IP addresses and/or other network-identification information, shown in FIG. 3A as IP addresses 312, to assessment discovery software 320. Network-identification information is discussed above in the context of at least block 220 of method 200.

IP address discovery software 310 can also track which devices have been processed by assessment software 112; e.g., by tracking which obtained IP addresses have been provided to assessment discovery software 320 as IP addresses 312 and/or by receiving information from assessment discovery software 320 and/or other components of assessment software 112 indicating that one or more devices have been processed by assessment software 112.

Assessment discovery software 320 can receive IP addresses 312 and embody a first device discovery technique, such as the first discovery technique discussed above in the context blocks 230 and 240 of method 200, after which a device is considered to be a known printing device, an unknown printing device, or a potential unknown device. As indicated in FIG. 3A, assessment discovery software 320 can attempt to obtain printing device information (PDI) identifying a device associated with a received IP address. For example, printing device information PDI can be and/or include identification information, which is discussed above in the context of at least blocks 230 and 240 of method 200.

If assessment discovery software 320 cannot obtain printing device information PDI, then assessment discovery software 320 can identify the device associated with the received IP address as an unknown printing device, as indicated in FIG. 3A. Otherwise, assessment discovery software 320 obtains printing device information PDI. Then, assessment discovery software 320 can examine printing device information PDI to determine whether printing device information PDI is associated with a known printing device. If printing device information PDI is associated with a known printing device, assessment discovery software 320 can identify the device associated with the received IP address as a known printing device, as indicated in FIG. 3A. Otherwise, as indicated in FIG. 3A, assessment discovery software 320 can identify the device associated with the received IP address as an unknown printing device. In some embodiments, assessment discovery software 320 can be configured to perform at least the procedures of blocks 230 and/or 240 of method 200; e.g., assessment discovery software 320 can include the above-mentioned assessment discovery engine.

Thread manager 322 can be used to manage threads and/or processes used by assessment software 112 to discover and/or collect data from devices connected to assessment device 110. The thread manager 322 can manage the threads and/or processes at least by creating, scheduling, and/or destroying one or more threads and/or processes used by assessment software 112.

Status monitoring discovery software (SDMS) 330 can attempt to discover whether potential unknown devices are printing devices. In particular, status monitoring discovery software 330 can make a second discovery attempt for a potential unknown device; i.e., a discovery attempt made after a discovery attempt made by assessment discovery software 320. In some embodiments, status monitoring discovery software 330 can be used to perform some or all of the functionality discussed above in the context of blocks 270 and 272 of method 200.

Status monitoring discovery software 330 can receive an IP address and/or other information about the potential unknown device from assessment discovery software 320 or another component of assessment software 112. In some embodiments, the IP address and/or other information about the potential unknown device can be stored in a data structure, such as a stack, list, queue, priority queue, or another related data structure, to await processing by status monitoring discovery software 330.

Status monitoring discovery software 330 can attempt to retrieve data from the potential unknown device using the received IP address and/or other information. If status monitoring discovery software 330 determines, based at least on data retrieved from the potential unknown device, that the potential unknown device is a printing device, then status monitoring discovery software 330 can generate a report indicating that the formerly-unknown device has been identified as a printing device. The report can provide some or all of the information used in discovery and/or discovered from the printing device. The report can be provided to one or more other components of assessment software 112 (e.g., status monitoring data collection software 332 for assessing an unknown printing device and/or assessment data collection software 334 for assessing a known printing device). Then, the other component(s) of assessment software 112 can use the report to attempt assessment of the printing device. However, if status monitoring discovery software 330 determines a potential unknown device is not a printing device, then status monitoring discovery software 330 can stop, as the potential unknown device is not a printing device and so is not to be assessed by assessment software 112.

Status monitoring data collection software (SMDCS) 332 can attempt to assess unknown printing devices. In some embodiments, status monitoring data collection software 332 can be used to perform some or all of the functionality discussed above in the context of block 260 of method 200.

Status monitoring data collection software 332 can receive an IP address and/or other information; e.g., printing device information about an unknown printing device, from assessment discovery software 320 or another component of assessment software 112. In some embodiments, the IP address and/or other information about the unknown printing device can be stored in a data structure, such as a stack, list, queue, priority queue, or another related data structure, to await processing by status monitoring data collection software 332.

Status monitoring data collection software 332 can attempt to collect data from the potential unknown device using the received IP address and/or other information. For example, status monitoring data collection software 332 can use a status monitoring data collection engine, such as discussed above in the context of method 200, to attempt to collect data for assessing the unknown printing device. Upon collection of the data for assessing the unknown printing device, status monitoring data collection software 332 can report the collected data. For example, the reported data can be used to assess the unknown printing device.

Assessment data collection software (ADCS) 334 can attempt to assess known printing devices. In some embodiments, assessment data collection software 334 can be used to perform some or all of the functionality discussed above in the context of block 250 of method 200.

Assessment data collection software 334 can receive an IP address and/or other information; e.g., printing device information about a known printing device, from assessment discovery software 320 or another component of assessment software 112. In some embodiments, the IP address and/or other information about the known printing device can be stored in a data structure, such as a stack, list, queue, priority queue, or another related data structure, to await processing by assessment data collection software 334.

Assessment data collection software 334 can attempt to collect data from the potential known device using the received IP address and/or other information. For example, assessment data collection software 334 can use an assessment data collection engine, such as discussed above in the context of method 200, to attempt to collect data for assessing the known printing device. Upon collection of the data for assessing the known printing device assessment data collection software 334 can report the collected data. For example, the reported data can be used to assess the known printing device.

Device training software 340 can observe communications between assessment device 110 and printing devices to develop and/or otherwise determine profile information for use by data collection engines, such as assessment data collection engine 334. In some embodiments, the herein-described functionality of device training software 340 can be performed by assessment data collection engine 334; e.g., assessment data collection engine 334 and device training software 340 can be merged.

Device training software 340 can train relatively-fast assessment data collection software 334 for fast data collection. Device training software 340 observes communication of status monitoring data collection software 332 and creates a profile for the properties, such as parameters, that provide valid responses, and store data about the properties that provide valid responses. For example, status monitoring data collection software 332 can redundantly query for data about one or more parameters (or other properties) from the printing device. Device training software 340 can observe which of the queried parameters (or other properties) lead to responses from the printing devices with response data related to the queried parameters (or other properties) and check the validity of the response data. If valid response data is observed for a queried parameter, the profile is updated to include data about the queried parameter, as the communication for the queried parameter can be considered to be successful. Device training software 340 can also determine and store data about dependencies between queried parameters in the profile as discussed immediately below. Then, based on unchanged independent properties recorded in the profile, assessment data collection software 334 can skip querying for parameters (or other properties) that did not provide data and/or lead to invalid data, and skip querying for dependent data. Thus, assessment data collection software 334 can use a profile generated by device training software 340 for fast data collection.

In some examples, a printing device can be classified as a known printing device if a profile accessible to assessment data collection engine 334 is associated with the model name for the printing device. For example, suppose assessment device 110 is connected to a network with at least two printing devices PD_MODEL1 and PD_MODEL2, where printing device PD_MODEL1 has a model name of "MODEL1" and printing device PD_MODEL2 has a model name of "MODEL2", and that assessment data collection engine 334 has a profile for printing devices having the model name "MODEL2" but does not have a profile for printing devices having the model name "MODEL1". In this example, based on model name information, PD_MODEL1 can be classified as an unknown printing device and PD_MODEL2 can be classified as a known printing device. In particular, PD_MODEL2 can be classified as a known printing device that is associated with the "MODEL2" profile.

Data in a profile can be used to speed communication with the known printing device. For example, the profile can include printing device information, communication information, and dependency information. The printing device information in a profile can include manufacturer and/or model information, and can be used to identify the profile as well as associate the profile with a printing device. For example, if assessment discovery software 320 obtains printing device information PDI1 from a device DEV1, then the manufacturer and/or model information in PDI1 can be used to search for or otherwise access a profile. Then, if a profile PRO1 is found after assessment discovery software 320 (or other software) searches for the manufacturer and/or model information in PDI1, then assessment discovery software 320 can classify DEV1 as a known printing device. However, if a profile such as PRO1 is not found after assessment discovery software 320 (or other software) searches for the manufacturer and/or model information in PDI1, then assessment discovery software 320 can classify DEV1 as an unknown printing device. Many other examples of printing device information in a profile are possible as well.

The communication information in a profile can indicate valid protocols, messages, parameters, responses, and other related information that can be used to communicate with a printing device associated with the profile. Continuing the example above, suppose that profile PRO1 to communicate with printing device having a model name of "MODEL2" indicates that a counter TotPages that counts a total number of pages printed by the printing device can be read using an SNMP message to get a parameter associated with an object identifier (OID) of "1.1.1", a counter TotScan that counts a total number of pages scanned by the printing device can be read using an SNMP message to get a parameter associated with an OID of "1.1.2". Then, using the communication information in PRO1, assessment device 110 can get the TotPages and TotScan counters from a "MODEL2" printing device using SNMP GET messages to get objects having respective OIDs of 1.1.1 and 1.1.2. Many other examples of communication information in a profile are possible as well.

The dependency information in a profile can indicate relationships between data provided by a printing device associated with the profile. For example, suppose a printing device maintains two sets of counters: an AllPrints set of counters and an AllToners set of counters. The AllPrints set of counters can include a TotPrints counter that counts all pages printed by the printing device, a ColorPrints counter that counts a total number of color pages printed by the printing device, and a BWPrints counter that counts a total number of black-and-white pages printed by the printing device. The AllToners set of counters can include a CyanToner counter that counts a level of cyan toner available to the printing device, YellowToner counter that counts a level of yellow toner available to the printing device, MagentaToner counter that counts a level of magenta toner available to the printing device, and a BlackToner counter that counts a level of black toner available to the printing device.

Then, dependency information in a profile for this printing device can indicate that the TotPrints, ColorPrints, and BWPrints counters are dependent upon the AllPrints set of counters, as the AllPrints set of counters includes the ColorPrints and BWPrints counters. Such dependency information can then specify that communications are not needed to obtain the TotPrints, ColorPrints, and BWPrints counters if the AllPrints set of counters have already been obtained. Similar dependency information can specify that the CyanToner, YellowToner, MagentaToner, and BlackToner counters are dependent upon the AllToners set of counters, and communications are not needed to obtain the CyanToner, YellowToner, MagentaToner, and BlackToner counters if the AllToners set of counters have already been obtained.

Dependency information can also include data dependent dependencies, which are dependencies that are based on values and/or other data obtained from a printing device. The dependencies can be expressed as rules regarding communication. Continuing this example, a TotPrints counter with a value of 0 can indicate that no pages have been printed by the printing device. In this case, the ColorPrints and BWPrints counters for the printing device must also have values of 0, and so communications are not needed to obtain the ColorPrints and BWPrints counters for the printing device. An example pseudo-code rule expressing this dependency of ColorPrints and BWPrints on TotPrints is shown in Table 4 below.

TABLE 4

| | |
|---|---|
| obtain(TotPrints); | // get TotPrints counter from printing device PD |
| if (TotPrints == 0) | // if TotPrints is zero |
| then { | // then, set ColorPrints and BWPrints to 0 |
|   ColorPrints = 0; | |
|   BWPrints = 0; | |
| }else { | // else get ColorPrints and BWPrints from PD |
|   obtain(ColorPrints); | |
|   obtain(BWPrints); | |
| } | |

Further extending this example, if the ColorPrints counter value obtained from the printing device is unchanged from a previous ColorPrints counter value obtained from the printing device, then color toner counters, such as CyanToner, YellowToner, and MagentaToner counters, are unchanged as well, and so communications are not needed to obtain the CyanToner, YellowToner, and MagentaToner for the printing device in this particular example. An example pseudo-code rule expressing this dependency of CyanToner, YellowToner, and MagentaToner on ColorPrints is shown in Table 5 below.

TABLE 5

| | |
|---|---|
| Saved_ColorPrints = ColorPrints; | // save current value of ColorPrints |
| obtain(ColorPrints); | // get ColorPrints counter from printing device PD |
| if (ColorPrints == Saved_ColorPrints) | // if ColorPrints is unchanged |

TABLE 5-continued

```
then {                      // then color toner counters = 0
  CyanToner = 0;
  YellowToner = 0;
  MagentaToner = 0;
} else {                    // else get color counters from PD
  obtain(CyanToner);
  obtain(YellowToner);
  obtain(MagentaToner);
}
```

Figure 3B:
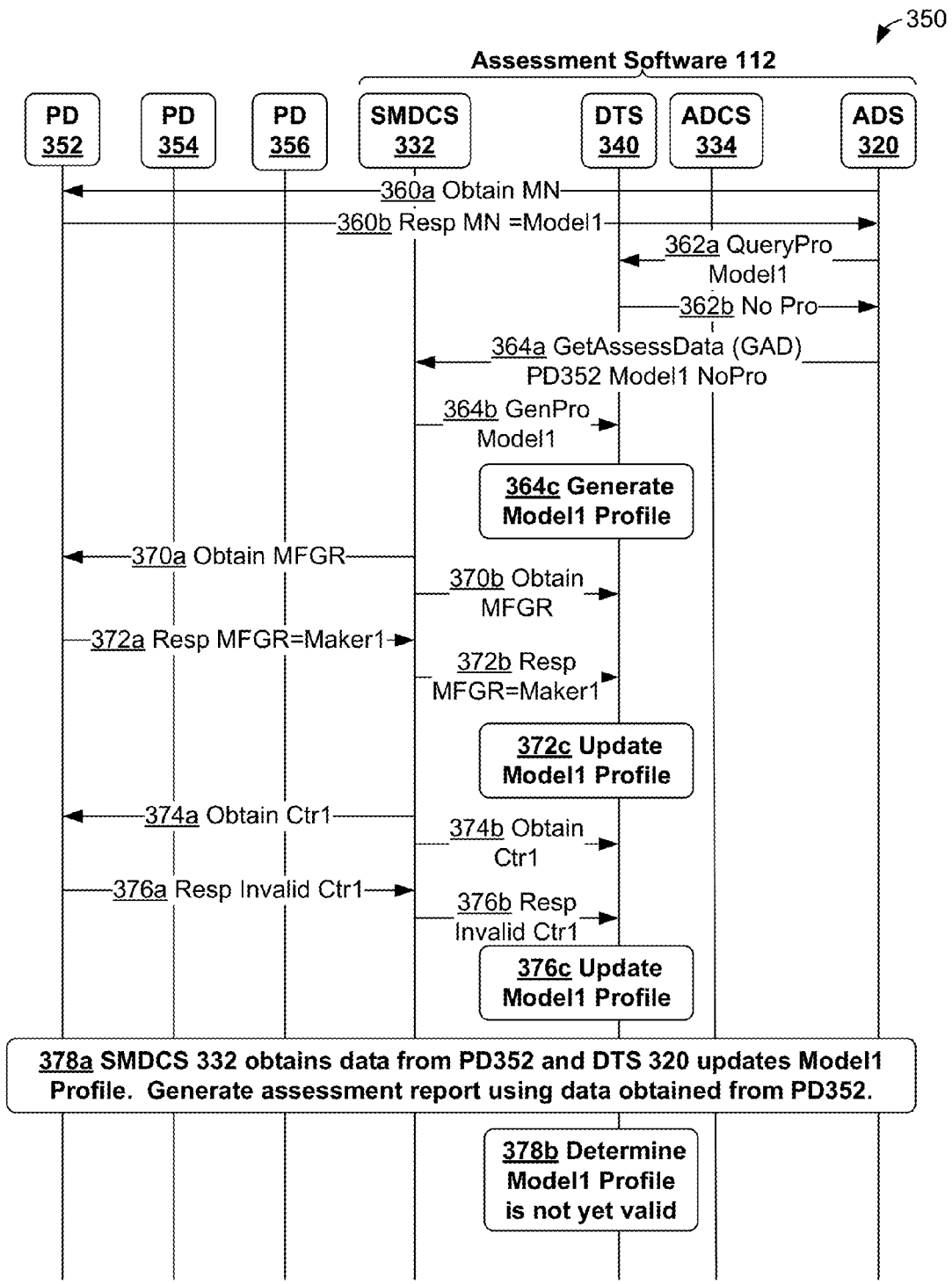
FIGS. 3B and 3C illustrate a scenario for obtaining profile information for use by data collection engines, according to an example embodiment.
Figure 3C:
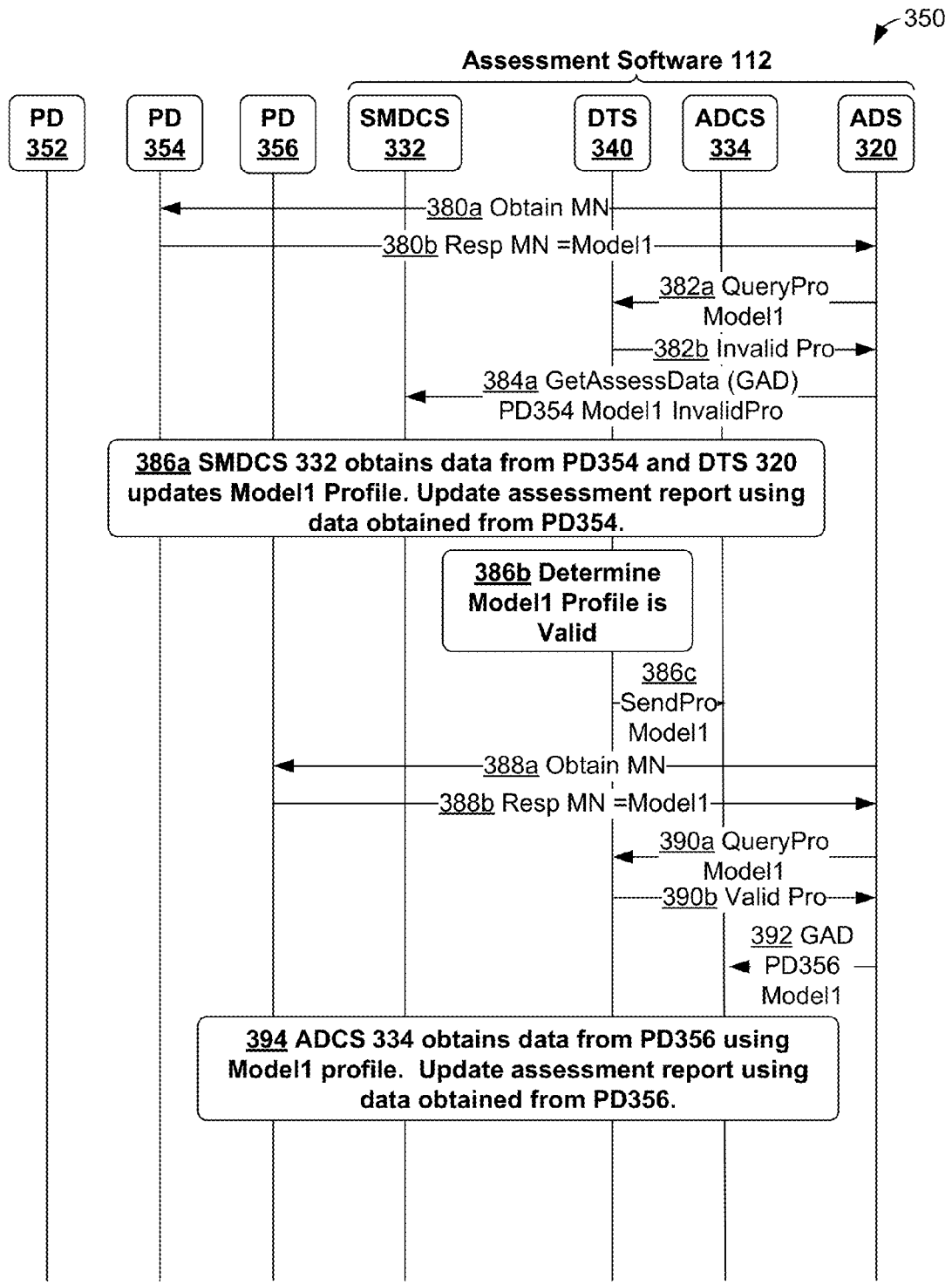

Many other examples of dependency information and related rules are possible as well. FIGS. 3B and 3C illustrate a scenario 350 for obtaining profile information for use by data collection engines, according to an example embodiment. In scenario 350, device training software 340 intelligently observes how relatively-slow status monitoring data collection software 332 discovers and collects data for unknown printing devices. The observations can include information about valid attempts to collect data, such as parameters and/or data about properties, of the printing device, information about invalid attempts to collect data about the printing device, and/or information about dependencies between data items in the collected data. The observations about data collection made by device training software 340 are stored in a profile, which can be used by assessment data collection software 334 for fast data collection.

In scenario 350, a model name is used as a key to determining both whether a printing device is a known printing device or an unknown, and for searching for profiles. If a printing device having a model name MN1 has a valid profile associated with MN1, then the printing device is considered to be a known printing device; otherwise, printing devices with a model name of MN1 would be considered as unknown printing devices. The profiles are stored in scenario 350 by assessment software 112 for use by both device training software 340 and assessment data collection software 334.

In scenario 350, assessment software 112 obtains data from three printing devices (PDs) 352, 354, and 356, connected to assessment device 110. Each of printing devices 352, 354, and 356 are manufactured by "Maker1" as "Model1" printing devices. At the onset of scenario 350, profile information for "Model1" printing devices is not available to assessment software 112, and "Model1" printing devices are classified as unknown printing devices.

Scenario 350 begins, as indicated in FIG. 3B, by assessment discovery software 320 of assessment software 112 sending message 360a to printing device 352 to obtain model name (MN) information. Printing device 352 responds to message 360a by sending message 360b to assessment discovery software 320 with a model name of "Model1".

After receiving message 360b, assessment discovery software 320 sends QueryPro message 362a to device training software 340 to query for a profile for "Model1". In scenario 350, profile information for "Model1" printing devices is not available to assessment software 112. In particular, device training software 340 does not have a profile for "Model1" printing devices at this stage of scenario 350. Therefore, device training software 340 responds to message 362a by sending No Pro message 362b to assessment discovery software 320 indicating no profile exists for "Model1" printing devices. By sending No Pro message 362b, device training software 340 can indicate that printing device 352 is an unknown printing device to assessment discovery software 320. As indicated in FIG. 3A, device data can be collected for unknown printing devices by status monitoring data collection software 332 of assessment software 112.

In response to No Pro message 362b, assessment discovery software 320 can send get assessment data (GAD) message 364a to status monitoring data collection software 332 requesting (relatively-slow) collection of assessment data from printing device 352. FIG. 3B indicates that message 364a includes information "PD352" indicating a source printing device for data collection, a printing device model name "Model1" for the printing device, and a "NoPro" indication to indicate that no profile related to printing device "PD352" is available to assessment software 112. The "NoPro" indication of message 364a can indicate to status monitoring data collection software 332 that communications to printing device 352 are to be copied to device training software 340, so that device training software 340 can generate a valid profile for "Model1" printing devices. Then, in response to the "NoPro" indication in message 364a, status monitoring data collection software 332 can (a) indicate profile generation for printing device 352 is active (e.g., set a bit, flag, or other software object to indicate profile generation for printing device 352) and (b) send GenPro (generate profile) message 364b instructing device training software 340 to generate a profile for a "Model1" printer. After receiving GenPro message 364b, device training software 340 generates a profile for a "Model1" printer at block 364c.

In response to get assessment data message 364a, status monitoring data collection software 332 can collect assessment data for use in assessing printing device 352. Data collection can begin with status monitoring data collection software 332 sending message 370a to printing device 352 to obtain information about a manufacturer as a "MFGR" parameter. For example, "Obtain" messages shown in scenario 350 can be embodied as one or more SNMP messages; e.g., SNMP GET message(s), with references, such as OID(s), to parameter(s) specified in one or more Management Information Base (MIBs). As profile generation is active for printing device 352, status monitoring data collection software 332 can send a copy of message 370a, shown in FIG. 3B as message 370b, to device training software 340 for profile generation.

Printing device 352 responds to message 370a by generating and sending response (Resp) 372a to status monitoring data collection software 332 with an indication that the manufacturer of printing device 352 is "Maker1". For example, "Resp" messages shown in scenario 350 can be embodied as one or more SNMP messages; e.g., SNMP response(s) to GET message(s) with data provided based on references, such as OID(s), to parameter(s) specified in one or more Management Information Base (MIBs). Status monitoring data collection software 332 can save the indication that the manufacturer of printing device 352 is "Maker1" as part of assessment data for printing device 352. As profile generation is active for printing device 352, status monitoring data collection software 332 can send a copy of message 372a, shown in FIG. 3B as message 372b, to device training software 340 for profile generation. After receiving message 372b, device training software 340 updates the profile for a "Model1" printer to include manufacturer information of "Model1" at block 372c.

Data collection can continue with status monitoring data collection software 332 sending message 374a to printing device 352 to obtain information about a counter "Ctrl". As profile generation is active for printing device 352, status monitoring data collection software 332 can send a copy of message 374a, shown in FIG. 3B as message 374b, to device training software 340 for profile generation.

Printing device 352 responds to message 374a by generating and sending response 376a to status monitoring data collection software 332 with an indication that counter "Ctrl" is invalid. Status monitoring data collection software 332 can save the indication that the counter "Ctrl" is invalid as part of assessment data for printing device 352. As profile generation is active for printing device 352, status monitoring data collection software 332 can send a copy of message 376a, shown in FIG. 3B as message 376b, to device training software 340 for profile generation. After receiving message 376b, device training software 340 updates the profile for a "Model1" printer to indicate that the counter "Ctrl" is invalid at block 376c.

Scenario 350 continues at block 378a with status monitoring data collection software 332 continuing to obtain assessment data from printing device 352. The collected assessment data is used by assessment software 112 to generate and/or update an assessment report for printing devices connected to assessment device 110. Additionally, at block 378a, device training software 340 continues to update the profile for the "Model1" printer based on communications between status monitoring data collection software 332 and printing device 352.

Upon completion of the communications between status monitoring data collection software 332 and printing device 352, device training software 340 can assess the "Model1" profile for validity. In some examples, a profile can be valid once a relatively small amount of printing device information and/or identification information is known, such as knowing both the model and manufacturer names (e.g., in scenario 350, knowing that printing device 352 is a "Model1" model of a "Maker1" manufactured (or branded) printing device).

In other examples, device training software 340 can determine that the relatively small amount of printing device information and/or identification information is not sufficient to treat the device as known and/or to generate a valid profile. For example, some devices can have internal defects, misconfigured data, and/or firmware issues and so the printing device may not behave in the same way as a proper printing device of the same model and manufacturer. Thus, device training software 340 can determine that such devices may be or are present in data provided by a particular printing device, and so determine that information provided by the particular printing device is insufficient to treat the device as known and/or to generate a valid profile.

For example, device training software 340 can examine various properties of data provided by the particular printing device to determine that provided information is (or is not) sufficient to treat the device as known and/or to generate a valid profile. These properties can include, but are not limited to, data provided by the particular printing device regarding:
 a missing or incorrect model name;
 a missing or incorrect manufacturer name;
 a missing or incorrect serial number;
 a missing or incorrect paper size or other printing-related parameter (e.g., a paper size of "B5" or a tray number of "local\ . . . ");
 missing or incorrect firmware information (e.g., firmware information does not match a pattern of an expected firmware version number—such as an expected firmware version number of "2F9_3000.010.004" where the provided firmware version number is "\etc\sysloc\ffw.sys"; and/or
 a missing or empty status value.

Device training software 340 can use one or more templates to determine expected values and so examine properties of data provided by the particular printing device, such as a template of "XXX_XXXX.XXX.XXX" for a firmware version number, where an "X" in the template represents a hexadecimal value (a value that is one of 0, 1, 2, 3, 4, 5, 6, 7, 8, 9, A, B, C, D, E, and F), and so would match the version number of "2F9_3000.010.004" but not match a string such as "\etc\sysloc\ffw.sys" shown in the firmware version number example above.

In scenario 350, device training software 340 determines that the communications with printing device 352 were insufficient to generate a valid profile for "Model1" printing devices, as indicated by block 378b.

As shown in FIG. 3C, scenario 350 continues with assessment discovery software 320 sending message 380a to printing device 354 to obtain model name information. Printing device 354 responds to message 380a by sending message 380b to assessment discovery software 320 with a model name of "Model1".

After receiving message 380b, assessment discovery software 320 sends QueryPro message 382a to device training software 340 to query for a profile for "Model1". At this stage of scenario 350, the profile information for "Model1" printing devices is invalid. Therefore, device training software 340 responds to message 382a by sending Invalid Pro message 382b to assessment discovery software 320 indicating an invalid profile exists for "Model1" printing devices. By sending Invalid Pro message 382b, device training software 340 can indicate that printing device 354 is an unknown printing device to assessment discovery software 320.

In response to Invalid Pro message 382b, assessment discovery software 320 can send get assessment data message 384a to status monitoring data collection software 332 requesting (relatively-slow) collection of assessment data from printing device 354. FIG. 3B indicates that message 384a includes information "PD354" indicating a source printing device for data collection, a printing device model name "Model1" for the printing device, and an "InvalidPro" indication to indicate that an invalid profile related to printing device "PD354" is available to assessment software 112. The "InvalidPro" indication of message 384a can indicate to status monitoring data collection software 332 that communications to printing device 354 are to be copied to device training software 340, in the same fashion discussed above in the context of the "NoPro" indication for printing device 352, so that device training software 340 can generate a valid profile for "Model1" printing devices.

As shown in block 386a of FIG. 3C, in response to get assessment data message 384a, status monitoring data collection software 332 can collect assessment data for use in assessing printing device 354, in a similar fashion as discussed above regarding collection of assessment data for printing device 352. The assessment data collected at block 386b is used by assessment software 112 to update the assessment report for printing devices connected to assessment device 110 generated at block 378b. In addition, communications between status monitoring data collection software 332 and printing device 354 for block 386a are copied to device training software 340 for updating and/or generating a valid profile for "Model1" printing devices.

In scenario 350, device training software 340 determines that the communications with printing device 354, perhaps in combination with the prior communications with printing device 352, were sufficient to generate a valid profile for "Model1" printing devices, as indicated at block 386b. Scenario 350 continues with device training software 340 sending SendPro message 386b to provide the valid profile for "Model1" printing devices to assessment data collection software 334. SendPro message 386c can include a copy of the valid profile and/or one or more references to the valid profile (e.g., a link or identifier that can be used to obtain the valid profile).

FIG. 3C shows that scenario 350 continues with assessment discovery software 320 sending message 388a to printing device 356 to obtain model name information. Printing device 356 responds to message 388a by sending message 388b to assessment discovery software 320 with a model name of "Model1".

After receiving message 388b, assessment discovery software 320 sends QueryPro message 390a to device training software 340 to query for a profile for "Model1". At this stage of scenario 350, the profile information for "Model1" printing devices is valid. Therefore, device training software 340 responds to message 390a by sending Valid Pro message 390b to assessment discovery software 320 indicating a valid profile exists for "Model1" printing devices. By sending Valid Pro message 390b, device training software 340 can indicate that printing device 356 is a known printing device to assessment discovery software 320.

In response to Valid Pro message 390b, assessment discovery software 320 can send get assessment data message 392a to assessment data collection software 334 requesting (relatively-fast) collection of assessment data from printing device 356. FIG. 3B indicates that message 392a includes information "PD356" indicating a source printing device for data collection and a printing device model name "Model1" for the printing device. Assessment data collection software 334 can use the "Model1" indication in message 392a to locate, access, query for, and/or otherwise obtain (e.g., request device training software 340 to provide) a valid profile for "Model1" printing devices.

As indicated by block 394, scenario 350 continues with assessment data collection software 334 obtaining assessment data from printing device 356 using the "Model1" profile. Assessment data collection software 334 can use the "Model1" profile to collect assessment data by making valid attempts to collect data, while avoiding known invalid attempts to collect data and/or attempts to collect known dependent data, based on valid attempt, invalid attempt, and dependency information in the profile. The assessment data collected at block 394 is used by assessment software 112 to update the assessment report for printing devices connected to assessment device 110 generated at block 378b. After updating the assessment report based on the assessment data collected from printing device 356, block 394 and scenario 350 can be completed.

Figure 4:
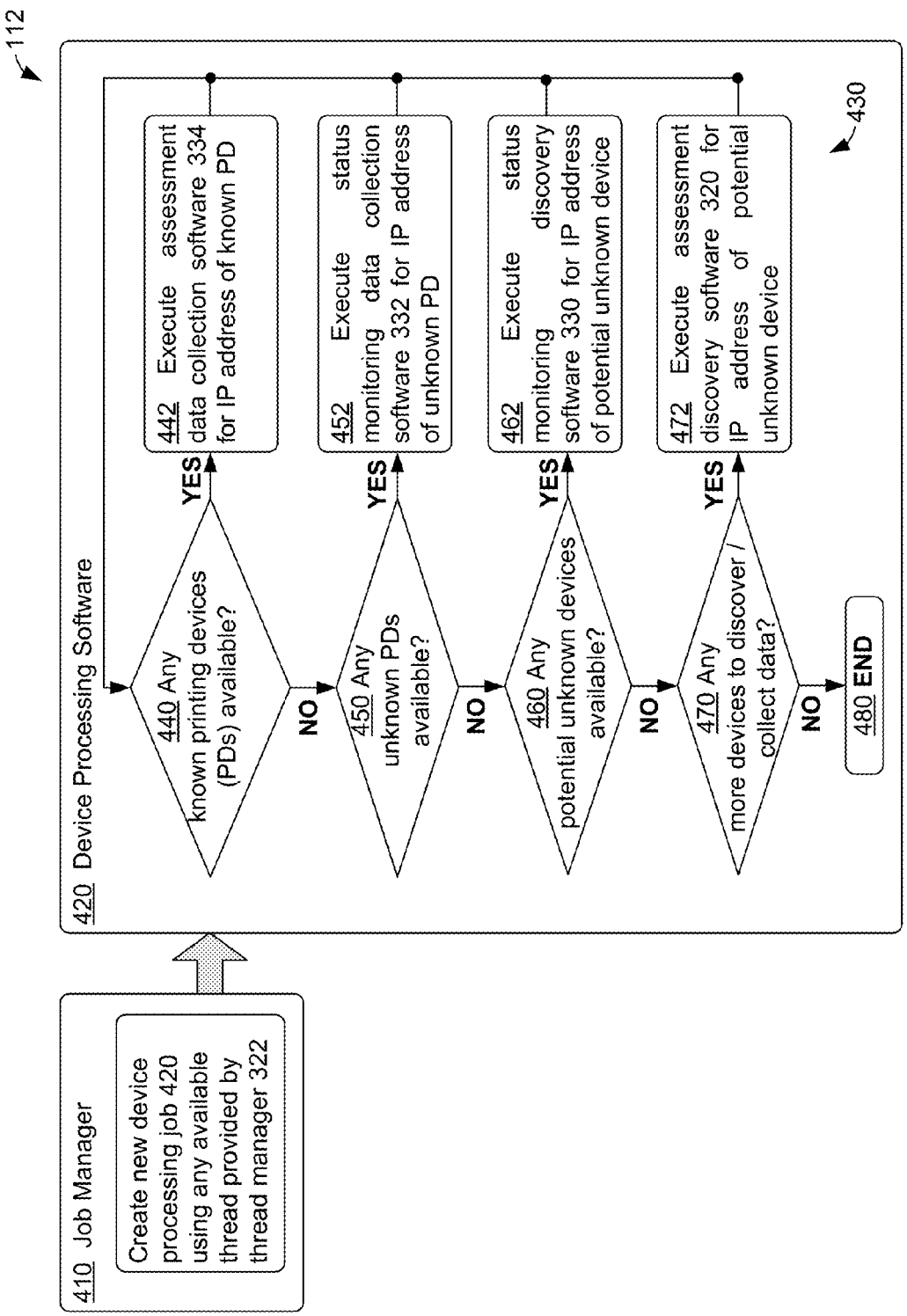
FIG. 4 is a diagram illustrating execution flow of device assessment jobs, according to an example embodiment.

FIG. 4 is a diagram illustrating execution flow of device assessment jobs, according to an example embodiment. As shown in FIG. 4, assessment software 112 can include components for device assessment, such as job manager 410 and device processing software 420.

In some embodiments, FIG. 4 illustrates execution flow of a device processing job utilizing device processing software 420, where the device processing job is triggered, or initiated, by device job manager 410. In some embodiments, each device processing job can be executed in a separate thread. In particular embodiments, threads for device processing jobs can be managed by thread manager 322.

At least four different types of device processing jobs can be managed by device job manager 410—these types of device processing jobs include (1) assessment discovery jobs that can execute assessment discovery software 320, (2) status monitoring discovery jobs that can execute status monitoring discovery software 330, (3) status monitoring data collection jobs that can execute status monitoring data collection software 332, and (4) assessment data collection jobs that can execute assessment data collection software 334. All of the at least four different types of device processing jobs can be executed simultaneously by assessment device 110 and/or assessment software 112 for multiple devices. Simultaneous execution of multiple device processing jobs can enable scaling up of assessment software 112 for effective use in large printer networks.

Each device processing job can have its own execution priority, where higher priority jobs are triggered before lower priority jobs. The execution priority can be based on the type of the job (e.g., a type such as discovery or data collection) and/or the discovery status of the device (e.g., a status such as known printing device, an unknown printing device, or a potential unknown device).

In some embodiments, data collection jobs, such as assessment data collection jobs and status monitoring data collection jobs, can have higher priority than discovery jobs, such as assessment discovery jobs and status monitoring data collection jobs. Assigning data collection jobs with a higher priority to discovery jobs can allow production of assessment reports that rely upon data collection results as early as possible, and so enhance transparency of assessment software 112.

In other embodiments, execution priority of jobs can depend on the discovery status of devices. For example, jobs for data collection from known printing devices can have a higher priority than jobs for data collection from unknown printing devices, which in turn can have a higher priority than jobs for data collection from potential unknown devices. Assigning a higher priority to data collection jobs for discovered printing devices, particularly known printing devices, can further allow production of assessment reports that rely upon data collection results as early as possible, as known devices likely take less time for data collection than unknown devices, and unknown devices likely take less time for data collection and are more likely to produce assessment reports than potential unknown devices. Thus, assigning a higher priority to data collection jobs for discovered printing devices can also enhance transparency of assessment software 112.

In still other embodiments, job manager 410 can be, or include the functionality of, thread manager 322. Then, thread manager 322 and/or job manager 410 can schedule one or more threads, where thread manager 322 and/or job manager 410 can determines whether resources of assessment device 110, such as memory, processing time, and/or other resources (e.g., input/output-related resources) are available to execute the one or more threads on assessment device 110. In some of these embodiments, The method of claim 6, wherein the one or more threads can include at least one of the following threads and perhaps other threads:

(1) a first thread for executing the first discovery technique, such as a thread for executing an assessment discovery job that can execute assessment discovery software 320 to discover known printing devices;

(2) a second thread for executing a first collection technique, such as a thread for executing an assessment data collection job that can execute assessment data collection software 334, to obtain printing-device-related information from known printing devices;

(3) a third thread for executing the second discovery technique, such as a thread for executing a status monitoring discovery job that can execute status monitoring discovery software 330, to discover unknown printing devices and/or potential unknown devices, and (4) a fourth thread for executing a second collection technique, such as a thread for executing a status monitoring data collection job that can execute status monitoring data collection software 332, to obtain printing-device-related information from unknown printing devices.

In more particular of these embodiments, thread manager 322 and/or job manager 410 can determine that resources of assessment device 110 are available to execute at least the above-mentioned second and fourth threads. Then, thread manager 322 and/or job manager 410 can execute at least the second and fourth threads so that the second thread has a higher priority than the fourth thread, as the second thread executes assessment data collection software 334, which obtains (or attempts to obtain) information from known printing devices, while the fourth thread executes status monitoring data collection software 332, which obtains (or attempts to obtain) printing-device-related information from unknown printing devices. The second thread can have a higher priority than the fourth thread since, as discussed above regarding the execution priority of jobs as depending on the discovery status of devices, threads and/or jobs collecting data from known printing devices can have higher priority than threads and/or jobs collecting data from unknown printing devices. Other examples of thread scheduling based on execution priority are possible as well.

FIG. 4 shows that job manager 410 can create a new device processing job. The device processing job can execute device processing software 420. The device processing job can be executed as a thread of assessment software 112 using any available thread provided by thread manager 322.

Device processing software 420 can execute method 430 to trigger device processing jobs. In particular, method 430 can be used to trigger device processing jobs by providing higher execution priority to assessment data jobs over device discovery jobs, and by providing higher priority to known printing devices than to unknown printing devices, providing higher priority to unknown printing devices than to potential unknown devices, and providing higher priority to potential unknown devices than to devices that have no known discovery status; i.e., only IP address information is currently available for a device. Other methods for triggering device processing jobs are possible as well.

As shown in FIG. 4, device processing software 420 can begin executing method 430 at block 440. At block 440, device processing software 420 can determine whether there are any known printing devices available for data collection. For example, device processing software 420 can query a data structure, such as a stack, list, queue, priority queue, or another related data structure, storing IP addresses for known printing devices to determine how many IP addresses for known printing devices are stored in the data structure; i.e., the query can return that zero or more IP addresses are in the data structure. If the query indicates that one or more IP addresses for known printing devices are stored in the data structure, thus indicating there are known printing devices available, device processing software 420 can retrieve an IP address for a known printing device and proceed to block 442. Otherwise, as no known printing devices are available, device processing software can proceed to block 450.

At block 442, device processing software 420 can trigger a device processing job that executes assessment data collection software 334 using the IP address of the known printing device retrieved at block 440. After triggering the device processing job, device processing software 420 can proceed to block 440.

At block 450, device processing software 420 can determine whether there are any unknown printing devices available for data collection. For example, device processing software 420 can query a data structure, such as a stack, list, queue, priority queue, or another related data structure, storing IP addresses for unknown printing devices to determine how many IP addresses for unknown printing devices are stored in the data structure. If the query indicates that one or more IP addresses for known printing devices are stored in the data structure, thus indicating there are unknown printing devices available, device processing software 420 can retrieve an IP address for an unknown printing device and proceed to block 452. Otherwise, as no unknown printing devices are available, device processing software can proceed to block 460.

At block 452, device processing software 420 can trigger a device processing job that executes status monitoring data collection software 332 using the IP address of the unknown printing device retrieved at block 450. After triggering the device processing job, device processing software 420 can proceed to block 440.

At block 460, device processing software 420 can determine whether there are any potential unknown devices available for discovery and/or data collection. For example, device processing software 420 can query a data structure, such as a stack, list, queue, priority queue, or another related data structure, storing IP addresses for potential unknown devices to determine how many IP addresses for potential unknown devices are stored in the data structure. If the query indicates that one or more IP addresses for potential unknown devices are stored in the data structure, thus indicating there are potential unknown devices available, device processing software 420 can retrieve an IP address for a potential unknown device and proceed to block 462. Otherwise, as no potential unknown devices are available, device processing software can proceed to block 470.

At block 462, device processing software 420 can trigger a device processing job that executes status monitoring discovery software 330 using the IP address of the potential unknown device retrieved at block 460. After triggering the device processing job, device processing software 420 can proceed to block 440.

At block 470, device processing software 420 can determine if there are any more devices for assessment software 112 to discover and/or collect data. For example, device processing software 420 can query a data structure, such as a stack, list, queue, priority queue, or another related data structure, storing IP addresses of devices that have not been assigned a discovery status to determine how many more devices that assessment software 112 has to discover and/or collect data. If the query indicates that one or more IP addresses for devices that have not been assigned a discovery status are stored in the data structure, thus indicating there are more devices available, device processing software 420 can retrieve an IP address for a device that has not been assigned a discovery status and proceed to block 472. Otherwise, as no more devices for assessment software 112 to discover and/or collect data, device processing software can proceed to block 480.

At block 472, device processing software 420 can trigger a device processing job that executes assessment discovery software 320 using IP address for a device that has not been assigned a discovery status retrieved at block 470. After triggering the device processing job, device processing software 420 can proceed to block 440.

At block 480, method 430 can end. In some embodiments, at block 480, device processing software 420 can wait for additional input, such as a signal indicating that more devices have been discovered in the printing network or another signal that all devices have been discovered in the printing network, before ending.

In other embodiments, rather than ending, at block 480, device processing software 420 can wait/sleep for a predetermined amount of time (e.g., one second, two seconds, 30 seconds) and proceed to block 440. In particular of these embodiments, after waiting a predetermined amount of time, device processing software 420 can increment a counter that is initially zeroed and end process 430 if the counter exceeds a predetermined value (e.g., a value between 2 and 10), thus terminating after a predetermined number of wait/sleep cycles. In more particular of these embodiments, the counter can be zeroed again if another device has been discovered in the printing network for job processing.

In still other embodiments, device processing software 420 can query additional data structures, such as data structures that store IP addresses for known printing devices, store IP addresses for unknown printing devices, and/or store IP addresses for potential unknown devices as well or instead of (again) querying the data structure storing IP addresses that have not been assigned a discovery status to determine how many more devices to discover and/or collect data. In these embodiments if device processing software 420 still determines that no more devices are available to discover and/or collect data after querying all of these data structures, device processing software can end at block 480; otherwise, device processing software 420 can proceed to block 440.

FIGS. 5A-5H illustrate scenario 500 for assessing devices in the printing network of FIG. 1, according to an example embodiment. In scenario 500, assessment device 110 is connected to printing network 100 and then executes assessment software 112. During execution, assessment software 112 discovers the eight other devices connected to printing network 100—that is, discovers non-printing devices 120, 122, 124, 126, 128, 140 and printing devices 130, 142—collects data about the discovered devices, and generates an assessment report about the discovered devices. The assessment report is provided in a transparent fashion while discovery, data collection, and assessment are being performed. Once the assessment report has been provided for all eight discovered devices, scenario 500 can end.

Initially in scenario 500, assessment device 110 is connected to printing network 100 and assessment software 112 starts to execute.

FIG. 5A shows example tables 510, 512 of IP addresses for devices in scenario 500, according to an example embodiment. Device name, IP address, and known/unknown status data of respective tables 510 and 512 of FIG. 5A are reproduced below as respective Tables 2 and 3

TABLE 2

| Device Name (Fig. 1A) | IP Address | Known/Unknown Status |
|---|---|---|
| Non-Printing Device 120 | xxx.xxx.xxx.001 | Unknown |
| Non-Printing Device 122 | xxx.xxx.xxx.002 | Unknown |
| Non-Printing Device 124 | xxx.xxx.xxx.101 | Unknown |
| Non-Printing Device 126 | xxx.xxx.xxx.102 | Unknown |
| Non-Printing Device 128 | xxx.xxx.xxx.003 | Unknown |
| Printing Device 130 | xxx.xxx.xxx.004 | Known |
| Non-Printing Device 140 | xxx.xxx.xxx.200 | Unknown |
| Printing Device 142 | xxx.xxx.xxx.201 | Unknown |

TABLE 3

| Device Name (Fig. 1A) | IP Address | Known/Unknown Status |
|---|---|---|
| Non-Printing Device 120 | xxx.xxx.xxx.001 | Unknown |
| Non-Printing Device 122 | xxx.xxx.xxx.002 | Unknown |
| Non-Printing Device 128 | xxx.xxx.xxx.003 | Unknown |
| Printing Device 130 | xxx.xxx.xxx.004 | Known |
| Non-Printing Device 124 | xxx.xxx.xxx.101 | Unknown |
| Non-Printing Device 126 | xxx.xxx.xxx.102 | Unknown |
| Non-Printing Device 140 | xxx.xxx.xxx.200 | Unknown |
| Printing Device 142 | xxx.xxx.xxx.201 | Unknown |

In scenario 500, assessment device 100 is executing assessment software 112 to discover, collect data, and assess the other devices in printing network 100, and assessment device 110 is not being assessed. Therefore, data for assessment device 110 (e.g., device name, IP address, and known/unknown status) is omitted from tables 510, 512 of FIG. 5A and in Tables 2 and 3 above.

The device names shown in FIG. 5A and in Tables 2 and 3 above correspond to the names used for devices in printing network 100 as shown in FIG. 1A. The IP addresses shown in FIG. 5A and in Tables 2 and 3, as well as in the rest of scenario 500, start with a partial IP address of "xxx.xxx.xxx". In scenario 500, the partial IP address "xxx.xxx.xxx" represents for a partial IP address (i.e., a network address) that is the same for all eight devices listed in tables 510, 512 of FIG. 5A and Tables 2 and 3 above. For example, if "xxx.xxx.xxx" stands for partial IP address of a "10.0.0", then the IP address of non-printing device 120 would be "10.0.0.001" and the IP address of printing device 142 would be "10.0.0.201". That is, all eight devices listed in tables 510, 512 of FIG. 5A and Tables 2 and 3 above are on the same subnet for scenario 500.

The known/unknown statuses listed in tables 510, 512 of FIG. 5A and Tables 2 and 3 above are shown as: (a) unknown for non-printing devices 120, 122, 124, 126, 128, and 140, as non-printing devices are considered to be potential unknown devices in scenario 500, (b) known for printing device 130 as printing device 130 is known to assessment software 112 in scenario 500, and (c) unknown for printing device 142 as printing device 142 is unknown to assessment software 112 in scenario 500.

FIG. 5B shows example initial assessment report 514 generated at "2:37:01 PM" before any devices of printing network 100 have been assessed; e.g., at the time that assessment software 112 is initially executed, according to an example embodiment. Initial assessment report 514 as shown in FIG. 5B includes the above-mentioned "Time" of "2:37:01 PM", and blank fields for "Device Information" and "Device Assessment".

Figure 5C:
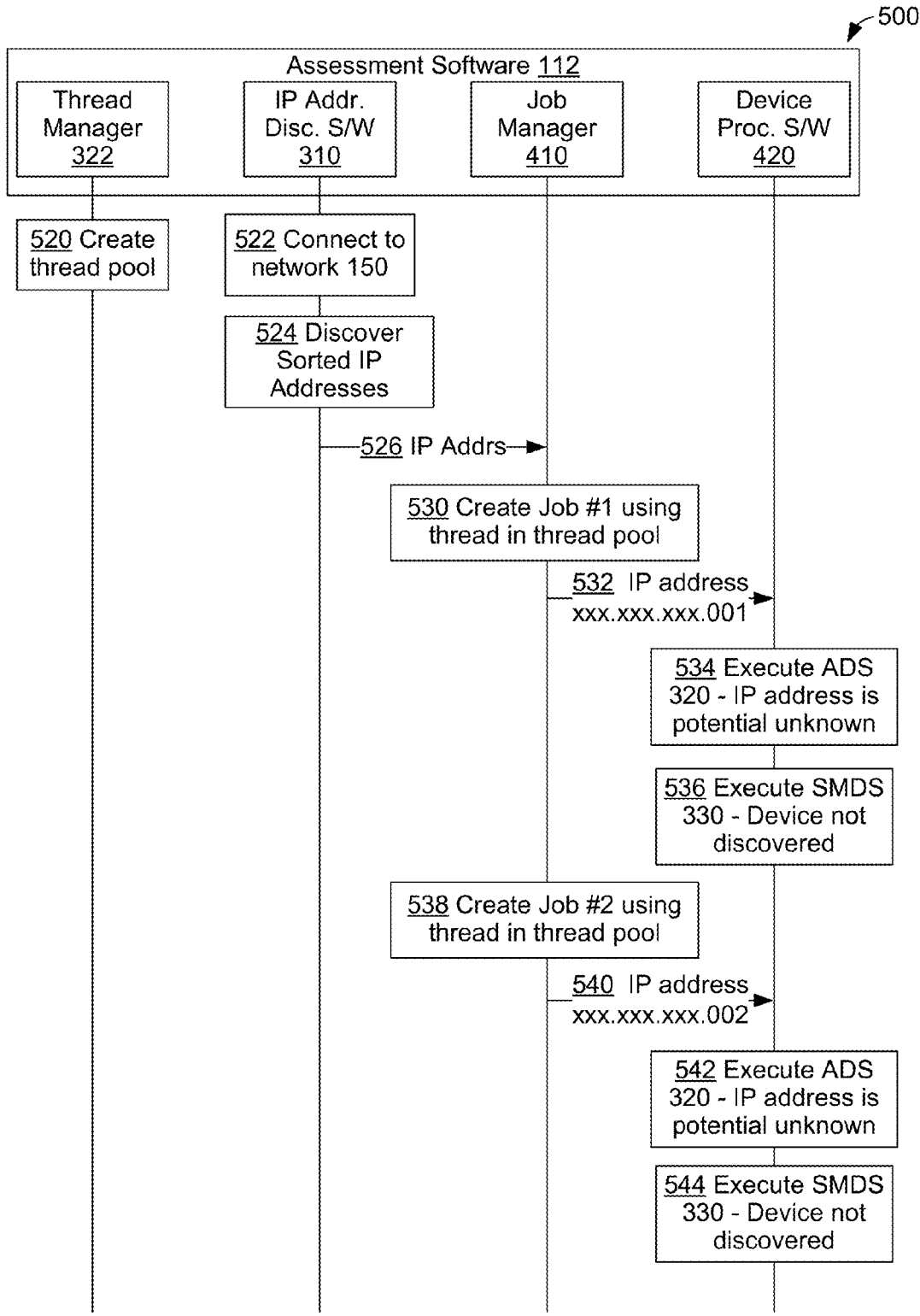

Scenario 500 continues with assessment software 112 discovering non-printing devices 120 and 122 in that order. FIG. 5C shows an example communication flow for discovering non-printing devices 120 and 122 by assessment software 112, according to an example embodiment. The communication flow of FIG. 5C begins with thread manager 322 performing the procedures of block 520 to create a thread pool for assessment device 112; e.g., one or more threads for executing one or more assessment discovery jobs, assessment data collection jobs, status monitoring discovery jobs, status monitoring data collection jobs, and/or other jobs.

At block 522, assessment software 112 uses IP address discovery software 310 to connect to network 150 of printing network 100. At block 524, IP address discovery software 310 discovers the eight IP addresses of non-printing devices 120, 122, 124, 126, 128, 140 and printing devices 130, 142 in IP address order; that is in the order of devices as listed in table 512 of FIG. 5A and Table 3 above. In other scenarios, IP address discovery software 310 can discover IP addresses of devices connected to network 150 and/or printing network 100 in a different order.

After discovering the IP addresses of devices in printing network 150, IP address discovery software 310 can provide the discovered IP addresses using IP addresses message 526. In scenario 500, IP addresses message 526 includes the eight IP addresses of non-printing devices 120, 122, 124, 126, 128, 140 and printing devices 130, 142 listed in IP address order (or in some other order in alternative scenarios). In other scenarios, other techniques than IP addresses message 526 can be used to communicate one or more IP addresses to job manager 310.

Upon reception of IP addresses message 526, job manager 410 executes the procedures of block 530 to trigger a job, Job #1, to discover, collect data and/or assess the first IP address in IP addresses message 526; that is, IP address "xxx.xxx.xxx.001" for non-printing device 120. In particular, job manager 410 uses a thread in the thread pool created at block 520 to trigger Job #1.

Upon triggering Job #1, job manager 410 sends message 532 to provide the IP address "xxx.xxx.xxx.001" to device processing software 420. In other scenarios, job manager 410 can provide the IP address "xxx.xxx.xxx.001" to device processing software 420 as part of triggering Job #1 or via some other technique; that is, message 532 may not be explicitly sent from job manager 410 to device processing software 420.

Upon reception of IP address "xxx.xxx.xxx.001", device processing software 420 can determine that "xxx.xxx.xxx.001" is not (yet) associated with a known printing device, an unknown printing device, or a potential unknown device. Then, at block 534, device processing software 420 can execute assessment discovery software (ADS) 320 to determine whether IP address "xxx.xxx.xxx.001" is associated with a known printing device, an unknown printing device, or a potential unknown device. In scenario 500, ADS 320 can determine that IP address "xxx.xxx.xxx.001" is associated with a potential unknown device.

After this determination by ADS 320, device processing software 420 can process the "xxx.xxx.xxx.001" IP address as being associated with a potential unknown device, and so execute status monitoring discovery software (SMDS) 330 to attempt to discover the potential unknown device associated with IP address "xxx.xxx.xxx.001" as illustrated by block 536 of FIG. 5C. In scenario 500, SMDS 330 determines that the device associated with IP address "xxx.xxx.xxx.001" which is non-printing device 120, is not a printing device. Then, in response to the determination that non-printing device 120 is not a printing device, device processing software 420 can determine that non-printing device 120 is not to be assessed. After determining that non-printing device 120 is not to be assessed, device processing software 420 can update assessment report 514 to report information about non-printing device 120. As illustrated in FIG. 5D, the update to assessment report 514 can include device information, such as a name "Device 120" and an associated IP address "xxx.xxx.xxx.001", and a "No assessment" indication about non-printing device 122.

As illustrated in FIG. 5C, scenario 500 continues with job manager 410 executing the procedures of block 538 to trigger a job, Job #2, to discover, collect data and/or assess the second IP address in IP addresses message 526; that is, IP address "xxx.xxx.xxx.002" for non-printing device 122. In particular, job manager 410 uses a thread in the thread pool created at block 520 to trigger Job #2.

Upon triggering Job #2, job manager 410 sends message 540 to provide the IP address "xxx.xxx.xxx.002" to device processing software 420. In other scenarios, job manager 410 can provide an IP address to device processing software 420 via some other technique as discussed above in the context of message 532.

Upon reception of IP address "xxx.xxx.xxx.002", device processing software 420 can determine that "xxx.xxx.xxx.002" is not (yet) associated with a known printing device, an unknown printing device, or a potential unknown device. Then, at block 542, device processing software 420 can execute ADS 320 to determine whether IP address "xxx.xxx.xxx.002" is associated with a known printing device, an unknown printing device, or a potential unknown device. In scenario 500, ADS 320 can determine that IP address "xxx.xxx.xxx.002" is associated with a potential unknown device.

After this determination by ADS 320, device processing software 420 can process the "xxx.xxx.xxx.002" IP address as being associated with a potential unknown device, and so execute SMDS 330 to attempt to discover the potential unknown device associated with IP address "xxx.xxx.xxx.002" as illustrated by block 544 of FIG. 5C. In scenario 500, SMDS 330 determines that the device associated with IP address "xxx.xxx.xxx.002", that is, non-printing device 122, is not a printing device. Then, in response to the determination that non-printing device 122 is not a printing device, device processing software 420 can determine that non-printing device 122 is not to be assessed. After determining that non-printing device 122 is not to be assessed, device processing software 420 can update assessment report 514 to report information about non-printing device 120. As illustrated in FIG. 5D, the update to assessment report 514 can include device information, such as a name "Device 122" and an associated IP address "xxx.xxx.xxx.002", and a "No assessment" indication for non-printing device 122.

FIG. 5D shows example assessment report 514 updated at "2:37:49 PM" after non-printing devices 120 and 122 have been discovered, according to an example embodiment. That is, assessment report 514 illustrated in FIG. 5D shows assessments for scenario 500 that have been completed after completion of block 544 (shown at the bottom of FIG. 5C). FIG. 5D shows that assessment report 514 lists two devices—"Device 120" and "Device 122"—having respective IP addresses of "xxx.xxx.xxx.001" and "xxx.xxx.xxx.002". Both devices are also shown as having an assessment of "Not assessed" indicating that neither "Device 120" nor "Device 122" was assessed as a printing device. In other scenarios, assessment report 514 is not updated to list non-printing devices. In still other scenarios, updates to assessment report 514 non-printing devices include updating a counter of non-printing devices; that is, at this stage of scenario 500, assessment report 514 can show an updated counter of 2 non-printing devices discovered (and not assessed) in printing network 100.

As mentioned above, scenario 500 proceeds as assessment software 112 assesses devices in printing network 100 in IP address order. Table 512 of FIG. 5A and Table 3 above indicate that, after the already-assessed printing devices 120 and 122, the next three devices to be assessed in scenario 500 are: non-printing device 128 associated with IP address "xxx.xxx.xxx.003", printing device 130 associated with IP address "xxx.xxx.xxx.004", and non-printing device 124 associated with IP address "xxx.xxx.xxx.101".

Figure 5E:
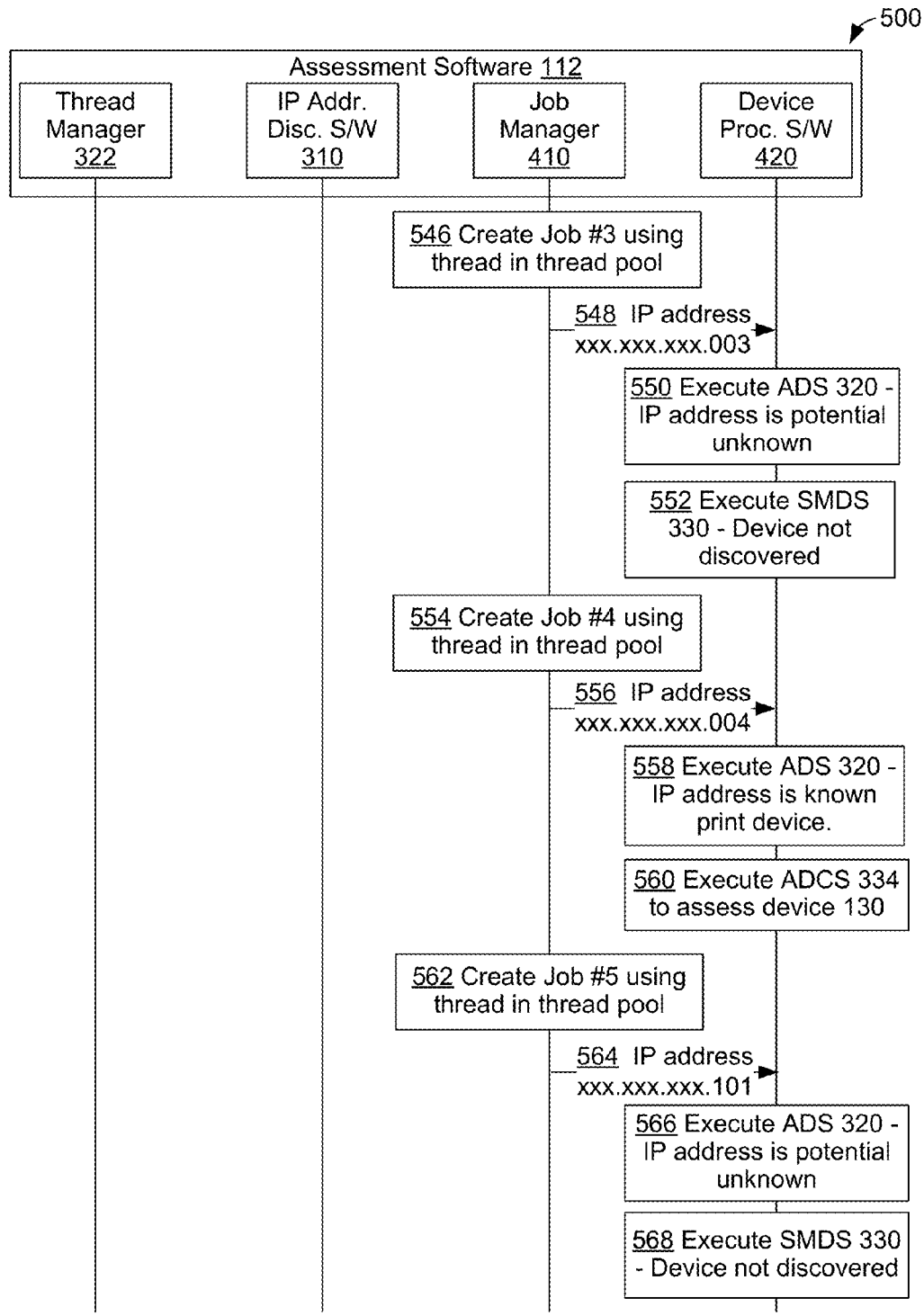

FIG. 5E shows an example communication flow related to discovery and assessment of non-printing device 128, printing device 130, and non-printing device 134, according to an example embodiment. Scenario 500 continues with job manager 410 executing the procedures of block 546 to trigger a job, Job #3, to discover, collect data and/or assess the third IP address in IP addresses message 526; that is, IP address "xxx.xxx.xxx.003" for non-printing device 128. In particular, job manager 410 uses a thread in the thread pool created at block 520 to trigger Job #3.

Upon triggering Job #3, job manager 410 sends message 548 to provide the IP address "xxx.xxx.xxx.003" to device processing software 420. In other scenarios, job manager 410 can provide an IP address to device processing software 420 via some other technique as discussed above in the context of message 532.

Upon reception of IP address "xxx.xxx.xxx.003", device processing software 420 can determine that "xxx.xxx.xxx.003" is not (yet) associated with a known printing device, an unknown printing device, or a potential unknown device. Then, at block 550, device processing software 420 can execute ADS 320 to determine whether IP address "xxx.xxx.xxx.003" is associated with a known printing device, an unknown printing device, or a potential unknown device. In scenario 500, ADS 320 can determine that IP address "xxx.xxx.xxx.003" is associated with a potential unknown device.

After this determination by ADS 320, device processing software 420 can process the "xxx.xxx.xxx.003" IP address as being associated with a potential unknown device, and so execute SMDS 330 to attempt to discover the potential unknown device associated with IP address "xxx.xxx.xxx.003" as illustrated by block 552 of FIG. 5E. In scenario 500, SMDS 330 determines that the device associated with IP address "xxx.xxx.xxx.003", that is, non-printing device 128, is not a printing device. Then, in response to the determination that non-printing device 128 is not a printing device, device processing software 420 can determine that non-printing device 128 is not to be assessed. After determining that non-printing device 128 is not to be assessed, device processing software 420 can update assessment report 514 to report information about non-printing device 128. As illustrated in FIG. 5F, the update to assessment report 514 can include device information, such as a name "Device 128" and an associated IP address "xxx.xxx.xxx.003", and a "No assessment" indication for non-printing device 128.

As illustrated in FIG. 5E, scenario 500 continues with job manager 410 executing the procedures of block 554 to trigger a job, Job #4, to discover, collect data and/or assess the fourth IP address in IP addresses message 526; that is, IP address "xxx.xxx.xxx.004" for printing device 130. In particular, job manager 410 uses a thread in the thread pool created at block 520 to trigger Job #4.

Upon triggering Job #4, job manager 410 sends message 556 to provide the IP address "xxx.xxx.xxx.004" to device processing software 420. In other scenarios, job manager 410 can provide an IP address to device processing software 420 via some other technique as discussed above in the context of message 532.

Upon reception of IP address "xxx.xxx.xxx.004", device processing software 420 can determine that "xxx.xxx.xxx.004" is not (yet) associated with a known printing device, an unknown printing device, or a potential unknown device. Then, at block 566, device processing software 420 can execute ADS 320 to determine whether IP address "xxx.xxx.xxx.004" is associated with a known printing device, an unknown printing device, or a potential unknown device. In scenario 500, ADS 320 can determine that IP address "xxx.xxx.xxx.004" is associated with a known printing device.

After this determination by ADS 320, device processing software 420 can process the "xxx.xxx.xxx.004" IP address as being associated with a known printing device, and so execute assessment data collection software 334 to attempt to collect data and assess the known printing device associated with IP address "xxx.xxx.xxx.004" as illustrated by block 560 of FIG. 5C. In scenario 500, DACS 334 is able to collect data from known printing device 130 associated with IP address "xxx.xxx.xxx.004".

Block 560 continues with device processing software 420 updating assessment report 514 with an assessment of known printing device 130. As illustrated in FIG. 5F, the update to assessment report 514 can include printing device information, such as a name "Device 130" and an associated IP address "xxx.xxx.xxx.004", and an assessment for printing device 130. The assessment can include information about printing device 130 such as:

A ratio of color pages to black and white (B&W) pages printed or otherwise processed by the printing device. The ratio value can be based on printed color and black and white page counts observed over some period of time (e.g., an hour, twelve hours, a day, a week, a month, etc.).

Color and/or black and white toner coverage rates. A coverage rate is an (average) percentage of printed pages covered with toner; e.g., a 5% coverage rate for a black and white printed page indicate that 5% of the printed page is colored using black toner and the remaining 95% of the printed page is not colored by the toner. Toner coverage rates can be determined for toner cartridges (or other toner storage devices) of various colors, such as cyan, magenta, yellow, and black (CMYK) toner cartridges and/or black-only toner cartridges. In some cases, CYMK toner cartridges are embodied as a set of four (independent) toner cartridges—a cyan toner cartridge, a yellow toner cartridge, a magenta toner cartridge, and a black toner cartridge. In these cases, coverage rates and/or other statistics, such as cartridge rate yields and drum yields discussed below, can vary per toner cartridge in the set of CYMK toner cartridges; e.g., a cyan toner coverage rate can vary from a yellow toner coverage rate.

Cartridge rate yields, which can be a number of pages printed per toner cartridge. Cartridge rate yields can be determined for cartridges of toners of various colors, such as CMYK toner cartridges and/or black-only toner cartridges.

Drum yields, or number of pages printed per toner drum. A toner drum can be a roller used to transfer toner to a printed page; that is, the printing device can put toner on a drum, the toner is transferred from the drum to a printed page using a transfer (belt) unit, and then a page is printed by heating and/or pressurizing the toner to fuse the toner and the now-printed page. Drum yields can be determined for drums used with toners of various colors, such as CMYK toners and/or black-only toner.

Transfer unit yields, or number of pages printed per transfer unit. Typically, one transfer unit is used for all colors of toner.

Usage and/or cost-related estimates, such as estimates of printing device usage and/or costs for some period of time (e.g., a day, a week, a month, three months, a year, etc.). The printing device usage estimates can include, but are not limited to, estimates of pages printed per period of time and estimates of pages scanned per period of time. The printing device cost estimates can include cost estimates related to toner costs per period of time, power costs per period of time, operating costs per period of time, per-page costs, and per-user costs over a period of time.

More, less, and/or different data can be provided in an assessment report.

For example, FIG. 5F shows assessment report 514 indicating that printing device 130 has been assessed by assessment software 112 as having:

- a "Printer Model" of "xxxx", indicating that printing device 130 is a model xxxx printer. In other scenarios, assessment report can also include a manufacturer name and perhaps other printing device information about a printing device, such as printing device 130.
- a "Color/B & W Ratio", having a value of "0%". The ratio value of 0% can suggest that printing device 130 is not a color printer, or perhaps is not being used as a color printer, as a 0% color/B &W ratio implies that the number of color pages printed is 0.
- a "Color . . . Toner Coverage Rate" of "0%" and a "B & W Toner Coverage Rate" of "7%", additionally suggesting that printing device 130 is not a color printer.
- "CYMK Cartridge Yields" for respective cyan, yellow, magenta, and black toners of "0" pages, "0" pages, "0" pages, and "13320" pages, further suggesting printing device 130 is not a color printer;
- "CYMK Drum Yields" for respective cyan, yellow, magenta, and black toners of "0" pages, "0" pages, "0" pages, and "26400" pages, further suggesting printing device 130 is not a color printer;
- A "Transfer Unit Yield" of "48300" pages;
- an estimated "Annual Usage" of "10000" pages;
- respective estimated annual "Toner" and "Power" costs of "$300" and "$100"; and
- an estimated "Annual Total Operation Cost" of "$400", which in scenario 500 is determined by summing the annual toner and power costs. In other scenarios, other techniques can be used to determine an annual (or other periodic) total operation cost.
- Also, an estimated "Annual Cost" per "User" of "$1.31".

As illustrated in FIG. 5E, scenario 500 continues with job manager 410 executing the procedures of block 562 to trigger a job, Job #5, to discover, collect data and/or assess the fifth IP address in IP addresses message 526; that is, IP address "xxx.xxx.xxx.101" for non-printing device 124. In particular, job manager 410 uses a thread in the thread pool created at block 520 to trigger Job #5.

Upon triggering Job #5, job manager 410 sends message 564 to provide the IP address "xxx.xxx.xxx.101" to device processing software 420. In other scenarios, job manager 410 can provide an IP address to device processing software 420 via some other technique as discussed above in the context of message 532.

Upon reception of IP address "xxx.xxx.xxx.101", device processing software 420 can determine that "xxx.xxx.xxx.101" is not (yet) associated with a known printing device, an unknown printing device, or a potential unknown device. Then, at block 566, device processing software 420 can execute ADS 320 to determine whether IP address "xxx.xxx.xxx.101" is associated with a known printing device, an unknown printing device, or a potential unknown device. In scenario 500, ADS 320 can determine that IP address "xxx.xxx.xxx.101" is associated with a potential unknown device.

After this determination by ADS 320, device processing software 420 can process the "xxx.xxx.xxx.101" IP address as being associated with a potential unknown device, and so execute SMDS 330 to attempt to discover the potential unknown device associated with IP address "xxx.xxx.xxx.101" as illustrated by block 568 of FIG. 5E. In scenario 500, SMDS 330 determines that the device associated with IP address "xxx.xxx.xxx.101", that is, non-printing device 124, is not a printing device. Then, in response to the determination that non-printing device 124 is not a printing device, device processing software 420 can determine that non-printing device 124 is not to be assessed. After determining that non-printing device 124 is not to be assessed, device processing software 420 can update assessment report 514 to report information about non-printing device 124. As illustrated in FIG. 5F, the update to assessment report 514 can include device information, such as a name "Device 124" and an associated IP address "xxx.xxx.xxx.101", and a "No assessment" indication for non-printing device 124.

FIG. 5F shows example assessment report 514 updated at "2:38:33 PM" after non-printing devices 120, 122, 124, 128 have been discovered and after printing device 130 has been assessed, according to an example embodiment. In particular, assessment report 514 has been updated since illustrated in FIG. 5D to include information about non-printing devices 124, 128 and printing device 130. That is, assessment report 514 illustrated in FIG. 5F shows assessments for scenario 500 that have been completed after completion of block 568 (shown at the bottom of FIG. 5E).

FIG. 5F shows an assessment of printing device 130 in assessment report 514—the assessment of known printing device 130 is discussed in more detail above in the context of block 560 of FIG. 5E. Additionally, assessment report 514 lists four devices with an assessment of "Not assessed": "Device 120", "Device 122", "Device 128" and "Device 124" having respective IP addresses of "xxx.xxx.xxx.001", "xxx.xxx.xxx.002", "xxx.xxx.xxx.003", and "xxx.xxx.xxx.101". That is, none of the devices "Device 120", "Device 122", "Device 128" and "Device 124" were assessed as a printing device. Other scenarios related to other techniques for providing an assessment report for non-printing devices are discussed above in the context of FIG. 5D.

As discussed above, scenario 500 proceeds as assessment software 112 assesses devices in printing network 100 in IP address order of devices. Table 512 of FIG. 5A and Table 3 above indicate that, after the already-assessed printing devices 120, 122, 128, 130, and 124, the next (and last) three devices to be assessed in scenario 500 are: non-printing device 126 associated with IP address "xxx.xxx.xxx.102", non-printing device 140 associated with IP address "xxx.xxx.xxx.200", and non-printing device 142 associated with IP address "xxx.xxx.xxx.201".

Figure 5G:
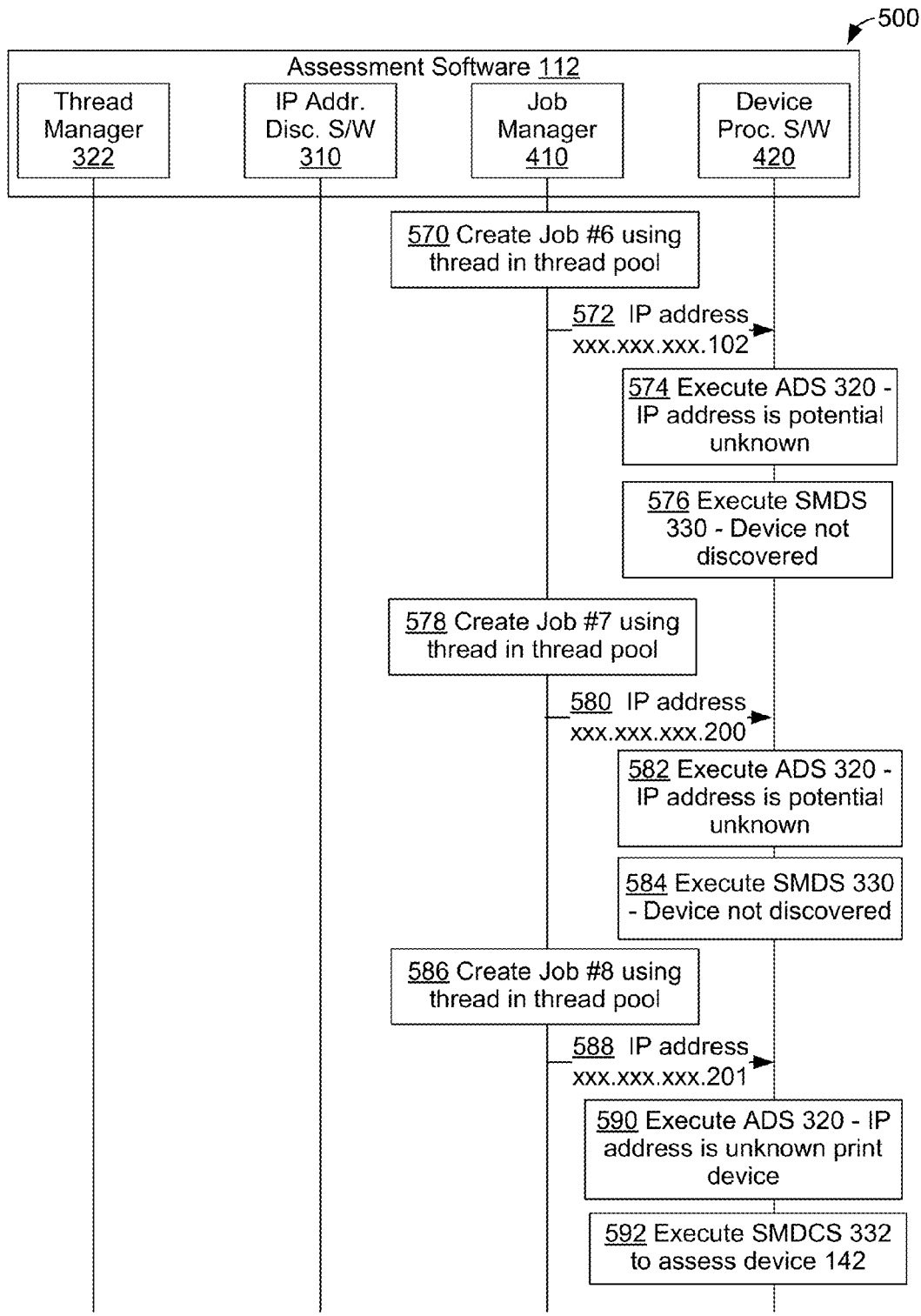

FIG. 5G shows an example communication flow related to discovery and assessment of non-printing devices 126, 140 and printing device 142, according to an example embodiment. Scenario 500 continues with job manager 410 executing the procedures of block 570 to trigger a job, Job #6, to discover, collect data and/or assess the sixth IP address in IP addresses message 526; that is, IP address "xxx.xxx.xxx.102" for non-printing device 126. In particular, job manager 410 uses a thread in the thread pool created at block 520 to trigger Job #6.

Upon triggering Job #6, job manager 410 sends message 572 to provide the IP address "xxx.xxx.xxx.102" to device processing software 420. In other scenarios, job manager 410 can provide an IP address to device processing software 420 via some other technique as discussed above in the context of message 532.

Upon reception of IP address "xxx.xxx.xxx.102", device processing software 420 can determine that "xxx.xxx.xxx.102" is not (yet) associated with a known printing device, an unknown printing device, or a potential unknown device. Then, at block 574, device processing software 420 can execute ADS 320 to determine whether IP address "xxx.xxx.xxx.102" is associated with a known printing device, an unknown printing device, or a potential unknown device. In scenario 500, ADS 320 can determine that IP address "xxx.xxx.xxx.102" is associated with a potential unknown device.

After this determination by ADS 320, device processing software 420 can process the "xxx.xxx.xxx.102" IP address as being associated with a potential unknown device, and so execute SMDS 330 to attempt to discover the potential unknown device associated with IP address "xxx.xxx.xxx.102" as illustrated by block 576 of FIG. 5G. In scenario 500, SMDS 330 determines that the device associated with IP address "xxx.xxx.xxx.102", that is, non-printing device 126, is not a printing device. Then, in response to the determination that non-printing device 126 is not a printing device, device processing software 420 can determine that non-printing device 126 is not to be assessed. After determining that non-printing device 126 is not to be assessed, device processing software 420 can update assessment report 514 to report information about non-printing device 126. As illustrated in FIG. 5H, the update to assessment report 514 can include device information, such as a name "Device 126" and an associated IP address "xxx.xxx.xxx.102", and a "No assessment" indication for non-printing device 126.

As illustrated in FIG. 5G, scenario 500 continues with job manager 410 executing the procedures of block 578 to trigger a job, Job #7, to discover, collect data and/or assess the seventh IP address in IP addresses message 526; that is, IP address "xxx.xxx.xxx.200" for non-printing device 140. In particular, job manager 410 uses a thread in the thread pool created at block 520 to trigger Job #7.

Upon triggering Job #7, job manager 410 sends message 580 to provide the IP address "xxx.xxx.xxx.200" to device processing software 420. In other scenarios, job manager 410 can provide an IP address to device processing software 420 via some other technique as discussed above in the context of message 532.

Upon reception of IP address "xxx.xxx.xxx.200", device processing software 420 can determine that "xxx.xxx.xxx.200" is not (yet) associated with a known printing device, an unknown printing device, or a potential unknown device. Then, at block 582, device processing software 420 can execute ADS 320 to determine whether IP address "xxx.xxx.xxx.200" is associated with a known printing device, an unknown printing device, or a potential unknown device. In scenario 500, ADS 320 can determine that IP address "xxx.xxx.xxx.200" is associated with a potential unknown device.

After this determination by ADS 320, device processing software 420 can process the "xxx.xxx.xxx.200" IP address as being associated with a potential unknown device, and so execute SMDS 330 to attempt to discover the potential unknown device associated with IP address "xxx.xxx.xxx.300" as illustrated by block 584 of FIG. 5G. In scenario 500, SMDS 330 determines that the device associated with IP address "xxx.xxx.xxx.200", that is, non-printing device 140, is not a printing device. Then, in response to the determination that non-printing device 140 is not a printing device, device processing software 420 can determine that non-printing device 140 is not to be assessed. After determining that non-printing device 140 is not to be assessed, device processing software 420 can update assessment report 514 to report information about non-printing device 126. As illustrated in FIG. 5H, the update to assessment report 514 can include device information, such as a name "Device 140" and an associated IP address "xxx.xxx.xxx.200", and a "No assessment" indication for non-printing device 140.

As illustrated in FIG. 5G, scenario 500 continues with job manager 410 executing the procedures of block 586 to trigger a job, Job #8, to discover, collect data and/or assess the eighth IP address in IP addresses message 526; that is, IP address "xxx.xxx.xxx.201" for unknown printing device 142. In particular, job manager 410 uses a thread in the thread pool created at block 520 to trigger Job #8.

Upon triggering Job #8, job manager 410 sends message 588 to provide the IP address "xxx.xxx.xxx.201" to device processing software 420. In other scenarios, job manager 410 can provide an IP address to device processing software 420 via some other technique as discussed above in the context of message 532.

Upon reception of IP address "xxx.xxx.xxx.201", device processing software 420 can determine that "xxx.xxx.xxx.201" is not (yet) associated with a known printing device, an unknown printing device, or a potential unknown device. Then, at block 590, device processing software 420 can execute ADS 320 to determine whether IP address "xxx.xxx.xxx.201" is associated with a known printing device, an unknown printing device, or a potential unknown device. In scenario 500, ADS 320 can determine that IP address "xxx.xxx.xxx.201" is associated with an unknown printing device.

After this determination by ADS 320, device processing software 420 can process the "xxx.xxx.xxx.201" IP address as being associated with an unknown printing device, and so execute status monitoring data collection software (SM-DCS) 332 to attempt to collect data and assess the known printing device associated with IP address "xxx.xxx.xxx.201" as illustrated by block 592 of FIG. 5G.

In scenario 500, SMDCS 332 is able to collect data from unknown printing device 142 associated with IP address "xxx.xxx.xxx.201".

Block 592 continues with device processing software 420 updating assessment report 514 with an assessment of unknown printing device 142. As illustrated in FIG. 5H, the update to assessment report 514 can include printing device information, such as a name "Device 142" and an associated IP address "xxx.xxx.xxx.201", and an assessment for printing device 12. The assessment can include information about printing device 142 as discussed above in the context of block 560 of FIG. 5E.

For example, FIG. 5H shows assessment report 514 indicating that printing device 142 has been assessed by assessment software 112 as having:
- a "Printer Model" of "yyyy", indicating that printing device 142 is a model yyyy printer. In other scenarios, assessment report 514 can also include a manufacturer name and perhaps other printing device information about a printing device, such as printing device 140.
- a "Color/B & W Ratio" of "12.3%", indicating that printing device 142 is a color printer.
- a "Color . . . Toner Coverage Rate" of "15%" and a "B & W Toner Coverage Rate" of "7%", further indicating that printing device 142 is a color printer.
- "CYMK Cartridge Yields" for respective cyan, yellow, magenta, and black toners of "9000" pages, "6600" pages, "8800" pages, and "10500" pages, further indicating that printing device 142 is a color printer.
- "CYMK Drum Yields" for respective cyan, yellow, magenta, and black toners of "28000" pages, "25000" pages, "32000" pages, and "33300" pages, further suggesting printing device 142 is a color printer.
- A "Transfer Unit Yield" of "42300" pages;
- an estimated "Annual Usage" of "5000" pages;
- respective estimated annual "Toner" and "Power" costs of "$1200" and "$200";
- an estimated "Annual Total Operation Cost" of "$1400"; and
- an estimated "Annual Cost" per "User" of "$4.59".

FIG. 5H shows example assessment report 514 updated at "2:39:27 PM" after non-printing devices 120, 122, 124, 126, 128, 140 have been discovered and after printing devices 130 and 142 have been assessed, according to an example embodiment. In particular, assessment report 514 has been updated since illustrated in FIG. 5F to include information about non-printing devices 126, 140 and printing device 142.

Scenario 500 continues with assessment software 112 determining that all devices in printing network 100 have been assessed. After all devices in printing network 100 have been assessed, assessment software 112 can update assessment report 514 to show total values of estimates of devices assessed during discovery, data collection, and assessment of printing network 100. FIG. 5H shows the total values of estimates indicated as "Grand Usage and Cost Totals" include:
- an estimated "Total Annual Printer Usage" of "60000" pages, which is determined in scenario 500 by summing the estimated annual printer usages of "10000" and "50000" pages for respective printing devices 130 and 142;
- estimated "Total Annual Toner" and "Power" costs being "$1500" and "$300" respectively, which is determined in scenario 500 by summing the estimated annual toner and power costs for respective printing devices 130 and 142;
- an estimated "Total Annual Printer Operation Cost" of "$1800", which is determined in scenario 500 by summing the estimated total annual toner and total annual power costs; and
- an estimated "Annual Cost" per "User" of "$5.90", which is determined in scenario 500 by summing the "$1.31" and "4.59" annual costs per user for respective printing devices 130 and 142.

Other total values and/or other techniques for determining total values are possible as well. After assessment software 112 has updated assessment report 514 to show total values of estimates as shown in FIG. 5H, scenario 500 can be completed.

FIGS. 6A-6D illustrate scenario 600 for assessing devices in a printing network, according to an example embodiment. In scenario 600, assessment device 110 executes assessment software 112 that includes data collection tool 610. Data collection tool 610 can, when executed, carry out at least part of the procedures of method 200, such as, but not limited to, the procedures of at least block 280 of method 200, regarding generation and/or updating of assessment reports.

Assessment device 110 communicates with assessment server 612 via network 602 to authenticate data collection tool 610. Once authenticated, data collection tool 610 communicates device data about printing devices to assessment server 612. Assessment server 612 uses the device data to generate assessment reports which are then communicated to data collection tool 610. Data collection tool 610 receives and subsequently displays the assessment reports. After displaying the assessment reports, scenario 600 can end.

Figure 6A:
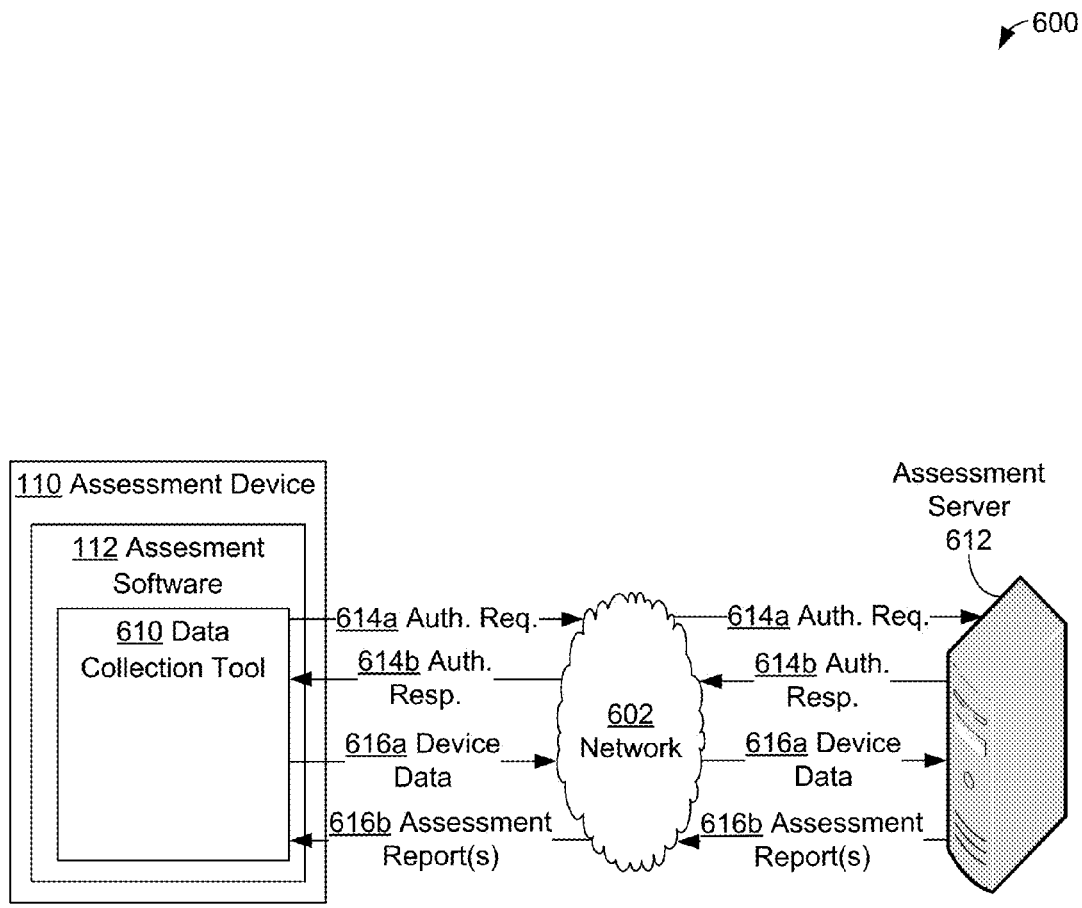

FIG. 6A shows an example communication flow related to data collection using data collection tool 610 of assessment device 110, communication of device data to assessment server 612, generation of assessment reports by assessment server 612, and communication of assessment reports to assessment device 110, according to an example embodiment.

Initially in scenario 600, assessment device 110 is connected to assessment server 612 via network 602 and assessment software 112, including data collection tool 610, is executed by assessment device 110. After assessment software 112 begins executing, communications between assessment device 110 and assessment server 612 begin.

A communication flow illustrated in FIG. 6A begins with data collection tool 610 sending authorization request 614a to assessment server 612 via network 602 to request approval (i.e., authorization) to send data from printing devices, receive corresponding assessment reports, and/or to otherwise communicate with assessment server 612. In scenario 600, approval for data collection tool 610 to communicate with assessment server 612 is granted. Then, assessment server 612 sends authorization response 614b to indicate this approval to data collection tool 610 via network 602.

After receiving authorization response 614b indicating approval from assessment server 612, data collection tool 610 sends device data 616a to assessment server 612 via network 602. Assessment server 612 processes data stored in device data 616a to generate one or more assessments. Then, assessment server 612 sends the generated assessments as one or more assessment reports. As illustrated in FIG. 6A, assessment server 612 sends the generated assessments using assessment report(s) message 616b to data collection tool 610 via network 602.

In some embodiments, data collection tool 610 can collect and display information about printing devices accessible to assessment device 110. The collected data can include a "snapshot", or copy of a printing device's current usage data at the time of collection. The current usage data can include lifetime counter totals and therefore can be fairly large for some printing devices.

After data collection tool 610 is initially executed, additional information can be obtained by executing data collection tool 610 again after a period of time; e.g., a few days, a week, a month. Then, two (or more) sets of data about printing devices can be collected—one set collected when data collection tool 610 is initially executed and one (or more) set(s) collected when data collection tool 610 is later executed.

One or more sets of data collected by data collection tool 610 can be exported, or communicated to another device. In some embodiments, exported data set(s) can be communicated in an easy-to-process format, such as a comma-separated-values (CSV) format or a flat file format. The exported set (or sets) of data can then be subsequently imported, or received by another device, where the other device executes software that can assess the imported set(s) of data, such as determining differences and/or trends over the period of time based on the imported set(s) of data. Data collection tool 610 can be executed repeatedly to obtain and determine usage counters, differences, and trend information over multiple periods of time.

Importing and/or exporting data can be controlled using an import and/or export user interface. For example, an export data interface can enable selection of some or all discovered printing devices using check boxes or another selection technique. Then, after some or all discovered printing devices are selected, data export can begin after clicking on or otherwise selecting an "Export" button or icon. After selection of the "Export" button or icon, an "Export" popup window can be presented. The "Export" popup window can be used to control the export of data that was collected from the selected printing devices. For example, the "Export" popup can enable selection of data files; i.e., one or more files containing data collected from a selected printing device (or devices) in CSV or another format, for export and a destination for the exported file(s). A default destination for files, such as an "export" folder or directory of a file system (or other storage system) of assessment device 110 hosting data collection tool 610 and/or assessment software 112.

The import and/or export user interface can further enable importing of exported data into one or more software packages, tools, and/or applications. For example, the exported data can be imported into a spreadsheet application, business management software, sales management tools, and/or other software.

In some embodiments, data collection tool 610 and/or assessment software 112 can be installed using a software installation package. The software installation package can, upon a user input such as a mouse click, extract and install data collection tool 610 and/or assessment software 112. The software installation package can set up any licensing functionality required to execute data collection tool 610 and/or assessment software 112; e.g., request and/or access a temporary or permanent license to use data collection tool 610 and/or assessment software 112.

In scenario 600, data collection tool 610 is executed to discover printing devices connected to a printing network. Upon execution of data collection tool 610 and/or assessment software 112, the executed software can attempt to discover, collect data, and assess at least printing devices connected to assessment device 110 as discussed above in the context of FIGS. 2-5H. The executed software can update one or more displays as printing devices are discovered and/or assesse. These display(s) can include a discovered devices display updated as devices are discovered and/or an assessment report, such as assessment report 514 discussed above in the context of scenario 500, which can be updated while devices are being assessed, and/or a dashboard display of data obtained from and/or generated about assessed printing devices.

Scenario 600 continues with data collection tool 610 being used to provide a discovered device display, such as discovered devices display 622, after at least some printing devices have been discovered. FIG. 6B shows discovered devices display 622 provided by data collection tool 610, according to an example embodiment. Discovered devices display 622 can include information about printing devices discovered by data collection tool 610, assessment software 112 and/or assessment device 110. As shown in FIG. 6B, the information provided by discovered devices display 622 can include status information 630, device type information 632, brand and model information 634, IP address information 636, and discovery status information 638. In other embodiments, discovered devices display 622 can provide more, less, and/or different information.

In scenario 600, discovered devices display 622 indicates that eight printing devices have been discovered. FIG. 6B shows that, in scenario 600, status information 630 indicates that three of the discovered printing devices have associated warnings and that five of the discovered printing devices have are ready for use. Other status information—such as powered off, rebooting/initializing, and disconnected—can be provided as part of status information as well. In some embodiments, status information 630 can provide additional information about warnings and/or other statuses; e.g., error code information, an error and/or an offline status.

Device type information 632 indicates whether a printing device is a known printing device or an unknown printing device. FIG. 6B shows that, in scenario 600, device type information 632 indicates that two printing devices—both "Brand 1" devices—are known printing devices and the remaining six printing devices are unknown printing devices.

Brand and model information 634 can provide brand (manufacturer) and model information for discovered printing devices. FIG. 6B shows that, in scenario 600, brand and model information 634 indicates that two printing devices are "Brand 1" devices, one printing device is a "Brand 2" device, two printing devices are "Brand 3" devices, two printing devices are "Brand 4" devices, and one printing device is a "Brand 5" device. Brand and model information 634 further indicates model information about each printing device. The model information indicates that: the two "Brand 1" printing devices include a "Model xxx" printing device and a "Model xxy" printing device, the "Brand 2" printing device is a "xxx Series" printing device, the two "Brand 3" printing devices are both "Cyyyy" printing devices, the two "Brand 4" printing devices include a "Laser xxx Type" printing device and a "Laser xxz Type" printing device, and the "Brand 5" printing device is a "MFP xxx" printing device.

In some embodiments, additional information can be included as part of brand and model information 634; e.g., a device name (or names), software version data, firmware version data, asset numbers, serial numbers, memory/other device equipment information. In particular of these embodiments, part or all of the additional information can be accessed via a Uniform Resource Locator (URL) or other reference linking to the additional information.

IP address information 636 can include IP address information for discovered printing devices. FIG. 6B shows that, in scenario 600, brand IP address information 636 indicates that eight IP addresses associated with printing devices have been discovered: "10.10.31.xxx", "10.191.1.xx", "10.191.1.xy", "10.191.1.yy", "10.191.2.yyy", "10.191.1.xz", "10.191.3.xx", and "10.191.1.yz". In other embodiments, IP address information 636 can include other printing device networking information, such as but not limited to, MAC addresses, printing device network and/or host names, partially and/or fully qualified domain names, and network interface information. In particular of these embodiments, part or all of the additional information can be accessed via a Uniform Resource Locator (URL) or other reference linking to the additional information.

Discovery status information 638 can include information about progress of data collection tool 610/assessment software 112 in discovering, collecting data, and assessing printing devices. FIG. 6B shows that, for each of the eight printing devices indicated by discovered devices display 622, a discovery status is "Data Collected" for each device as indicated by discovery status information 638. In other scenarios, other statuses, such as "To be discovered", "Discovered", "Assessed", etc. can be displayed as part of discovery status information 638.

FIG. 6B shows that discovered devices display 622 can include tabs for accessing other aspects of data collection tool 610, such as settings tab 620 to access a settings interface for reviewing, updating, removing, and/or inserting configuration data related to operating data collection tool 610 and/or assessment software 112, a tab associated with discovered device display 622, a tab associated with assessment display 624, and a tab associated with a data export interface for controlling export of data collected by data collection tool 610. Discovered devices display 622 can include buttons 640, 642, 644 respectively for: updating authentication (e.g., authentication providing access to a printing network, authentication related to licensing data collection tool 610), filtering results shown in discovered devices display 622, and pausing discovery performed by data collection tool 610 and/or assessment software 112. In other embodiments, more, fewer, and/or different tabs, buttons, and/or other user interface controls (e.g., icons, menus including drop-down menus, dialogs including pop-up dialogs, links) can be provided with discovered devices display 622.

In some embodiments, a discovered devices display, such as discovered devices display 622, can have or be associated with a collected data view that is updated as data is collected from printing devices for assessment.

Scenario 600 continues with data collection tool 610, executed as part of assessment software 112 on assessment device 110, displaying one or more assessments using information conveyed in assessment report(s) message 616b. The assessment(s) can be displayed by selection of the tab of discovered devices display 622 associated with assessment display 624.

Figure 6C:
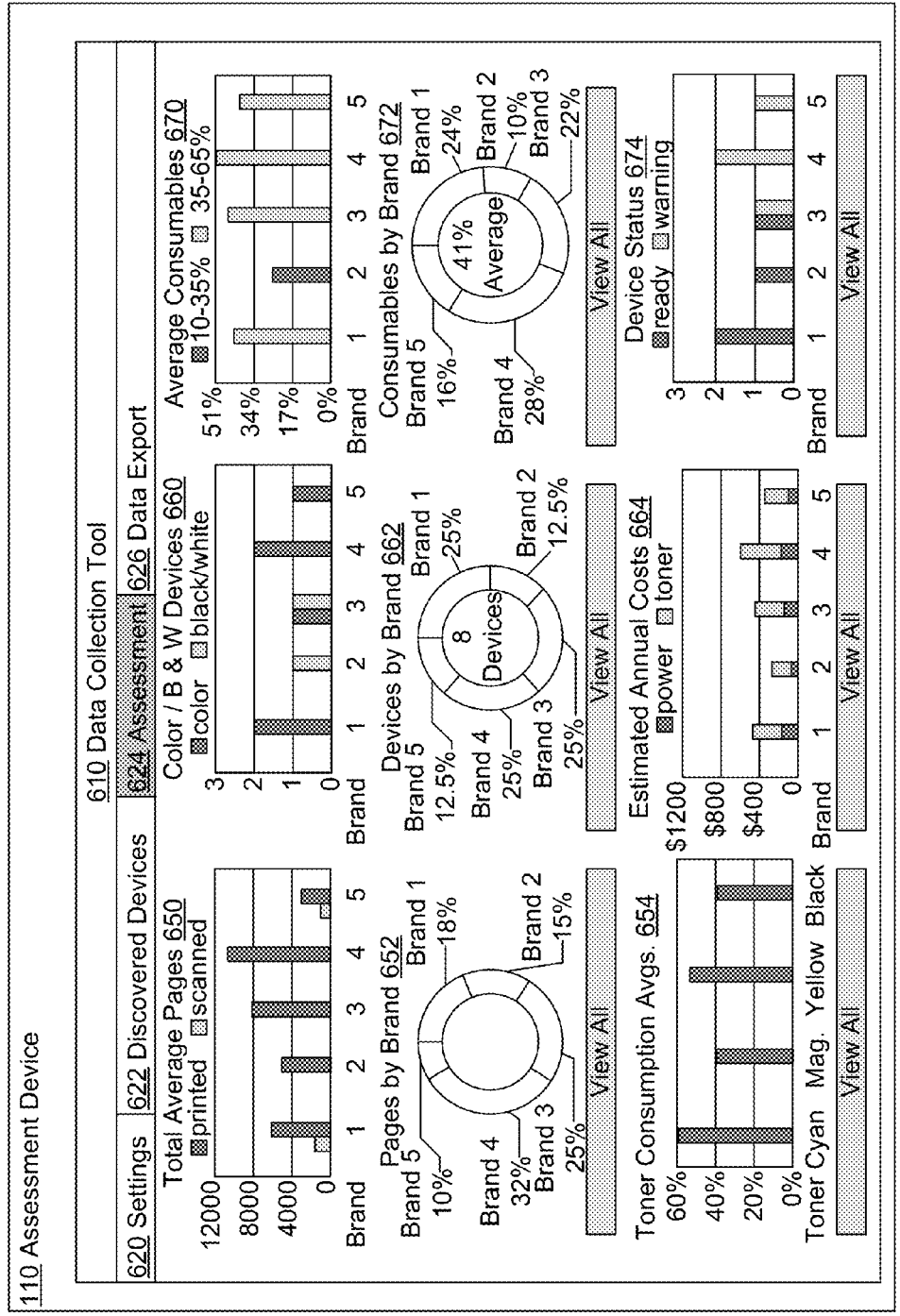

FIG. 6C shows an example summary view of assessment display 624 provided by data collection tool 610, according to an example embodiment. Assessment display 624 can provide the summary view of assessed printing devices showing charts 650, 652, 654, 660, 662, 664, 670, 672, 674 as a default view; in other scenarios, assessment display 624 can provide more and/or different views than the summary view shown by FIG. 6C and/or provide a different view as a default view. In still other scenarios, assessment display 624 can be personalized by adding, deleting, moving, resizing, and/or otherwise changing charts shown in the summary view.

FIG. 6C shows a summary view of assessment display 624 generated using data from all devices assessed during scenario 600, where the summary view can be used to assess printing devices on a per-brand basis. Assessment display 624 includes nine sub-displays with charts, including: total average pages chart 650, pages by brand chart 652, toner consumption averages chart 654, color/black and white devices chart 660, devices by brand chart 662, estimated annual costs chart 664, average consumables chart 670, consumables by brand chart 672, and device status chart 674. The nine charts 650, 652, 654, 660, 662, 664, 670, 672, 674 graphically present assessment data that can be arranged into six assessment categories, including: a page count category presented using charts 650, 652, a device count category presented using charts 660, 662, a consumables category presented using charts 670, 672, a toner (or other colorant such as ink) consumption category presented using chart 654, a costs category presented using chart 664, and a device status category presented using chart 654.

Additional information about an assessment category can be obtained by selection of the corresponding "View All" button; that is, additional information about the respective page count, device count, consumables, toner consumption, costs, and device status assessment categories can be found by selecting the respective "View All" button under respective charts 652, 662, 672, 654, 665, and 674.

Total average pages chart 650 can present information about a total average number of pages printed and/or scanned by assessed printing devices on a per-brand basis. FIG. 6C shows that chart 650, which is a bar chart, indicates that printing device of brands "1" and "5" were the only devices to have scanned one or more pages, while that printing devices of each of brands "1", "2", "3", "4", and "5" printed one or more pages. Chart 650 shows that the average number of pages scanned by respective brand "1" and brand "5" devices are respectively about 1200 pages and about 800 pages. Chart 650 also shows that the average number of pages printed by printing devices of respective brands "1", "2", "3", "4", and "5" are respectively about 5600 pages, about 4800 pages, about 8000 pages, about 10000 pages, and about 3200 pages.

Pages by brand chart 652 can present information about per-brand percentages of pages printed by assessed printing devices. FIG. 6C shows that chart 652, which is a doughnut chart, indicates that printing devices of respective brands "1", "2", "3", "4", and "5" respectively printed 18%, 15%, 25%, 32%, and 10% of the total average number of printed pages.

Toner consumption averages chart 654 can present information about toner consumption on per-color basis. FIG. 6C shows that chart 654, which is a bar chart, indicates that respective cyan, magenta, yellow, and black toners were respectively about 60% consumed, about 40% consumed, about 50% consumed, and about 40% consumed by assessed printing devices during a period of time between assessments of the assessed printing devices.

Color/black and white devices chart 660 can present information about assessed color and black and white printing devices on a per-brand basis. FIG. 6C shows that chart 660, which is a bar chart, indicates of the assessed printing devices, brand "1" devices include two color printing devices, brand "2" devices include one black and white printing device, brand "3" devices include one color printing device and one black and white printing device, brand "4" devices include two color printing devices, and brand "4" devices include one color printing device.

Devices by brand chart 662 can present information about per-brand percentages of assessed color and black and white printing devices. FIG. 6C shows that chart 662, which is a doughnut chart, indicates that respective manufacturers of brands "1", "2", "3", "4", and "5" respectively manufactured 25%, 12.5%, 25%, 25%, and 12.5% of assessed printing devices.

Estimated annual costs chart 664 can present information about estimated costs, such as estimated power and toner costs, for assessed printing devices on a per-brand basis. FIG. 6C shows that chart 664, which is a bar chart, indicates that:

the annual power costs for printing devices of respective brands "1", "2", "3", "4", and "5" are estimated to be about $175, about $75, about $150, about $175, and about $100, respectively;

the annual power costs for printing devices of respective brands "1", "2", "3", "4", and "5" are estimated to be about $300, about $200, about $300, about $425, and about $250, respectively; and the sum of the annual power and annual toner costs for printing devices of respective brands "1", "2", "3", "4", and "5" are estimated to be about $475, about $275, about $450, about $600, and about $350, respectively.

Average consumables chart 670 can present information about consumables (e.g., toner, drums, transfer units, etc.) used by assessed printing devices on a per-brand basis. FIG. 6C shows that chart 670, which is a bar chart, indicates for the printing devices assessed during scenario 600 that printing devices of respective brands "1", "2", "3", "4", and "5" averaged respective percentage usages of consumables of about 44%, about 25%, about 46%, about 51%, and about 40%.

Consumables by brand chart 672 can present information about per-brand percentages of consumables used by assessed printing devices. FIG. 6C shows that chart 672, which is a doughnut chart, indicates that printing devices of respective brands "1", "2", "3", "4", and "5" respectively consumed 24%, 10%, 22%, 28%, and 18% of all consumables during a period of time between assessments of the assessed printing devices.

Device status chart 674 can present information about device statuses (e.g., ready, warning, error, offline) for devices on a per-brand basis. FIG. 6C shows that chart 674, which is a bar chart, indicates that the assessed printing devices include: two brand "1" devices each having a "ready" status, one brand "2" device having a "ready" status, two brand "3" devices with one device having a "ready" status and one device having a "warning" status, two brand "4" devices each having a "warning" status, and one brand "5" device having a "warning" status.

In other scenarios, more, fewer, and/or different charts, assessment categories, views, and/or data can be provided, presented, and/or displayed by assessment display 624.

Figure 6D:
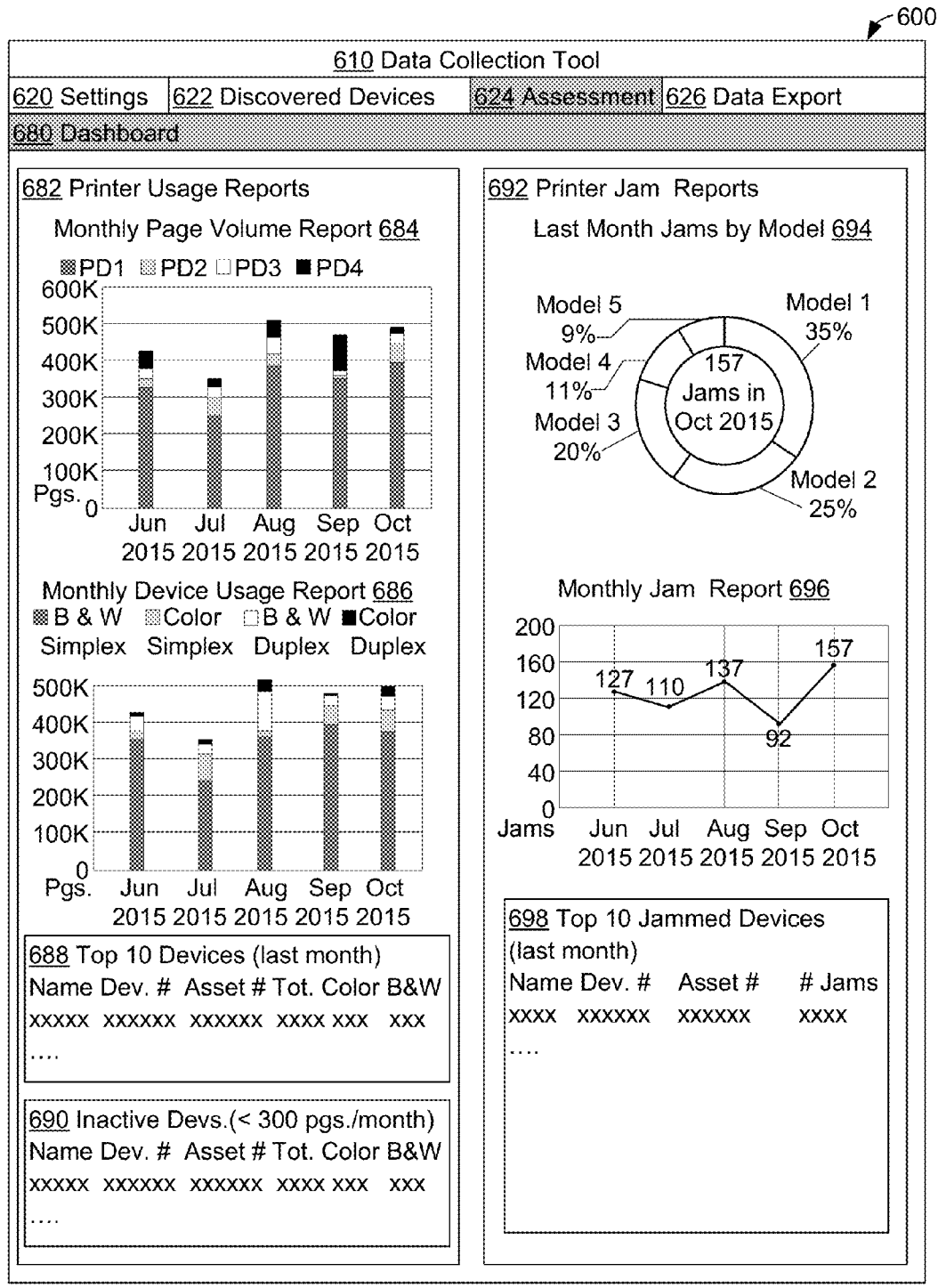

Scenario 600 continues with data collection tool 610 being used to display assessment dashboard 680 related to assessment display 624. FIG. 6D shows an example assessment dashboard 680 provided by data collection tool 610, according to an example embodiment. The information provided in dashboard 680 is determined in scenario 600 using data analysis techniques carried out by assessment server 612. In other scenarios, some or all of the data analysis techniques used to provide dashboard 680 can be carried out by assessment device 110, assessment software 112, and/or data collection tool 610.

Assessment dashboard 680 includes information about printer usage and printer jams (stuck paper events) for printing devices assessed during scenario 600, including printer usage reports 682 and printer jam reports 692. Printer usage reports 682 include monthly page volume report 684, monthly device usage report 686, top 10 device usage report 688, and inactive devices report 690. Printer jam reports 692 include last month jams by model report 694, monthly jam report 696, and top 10 jammed devices report 698. In scenario 600, printer usage reports 682 and printer jam reports 692 are determined over one or more months. In other scenarios, printer usage and/or printer jam reports can be determined for more and/or different periods of time; e.g., reports determined over one or more days, weeks, quarters, years, etc.

Monthly page volume report 684 can present information about a number of pages printed by a number of printing devices on a monthly basis, where the printing devices include four printing devices named "PD1", "PD2", "PD3", and "PD4". FIG. 6D illustrates that report 684 indicates:

in the month of "June 2015", printing devices "PD1", "PD2", "PD3", and "PD4" respectively printed about 350,000 (350K) pages, about 25,000 pages, about 25,000 pages, and about 50,000 pages, and cumulatively printed about 425,000 pages;

in the month of "July 2015", printing devices "PD1", "PD2", "PD3", and "PD4" respectively printed about 250,000 pages, about 50,000 pages, about 25,000 pages, and about 25,000 pages, and cumulatively printed about 350,000 pages;

in the month of "August 2015", printing devices "PD1", "PD2", "PD3", and "PD4" respectively printed about 387,500 pages, about 31,000 pages, about 44,000 pages, and about 50,000 pages, and cumulatively printed about 512,500 pages;

in the month of "September 2015", printing devices "PD1", "PD2", "PD3", and "PD4" respectively printed about 350,000 pages, about 12,500 pages, about 12,500 pages, and about 95,000 pages, and cumulatively printed about 470,000 pages; and in the month of "October 2015", printing devices "PD1", "PD2", "PD3", and "PD4" respectively printed about 390,000 pages, about 60,000 pages, about 25,000 pages, and about 12,500 pages and cumulatively printed about 487,500 pages.

Monthly device usage report 686 can present information about a number of pages printed as a number of types of printing devices on a monthly basis, where the types of printing devices include black and white simplex (one-sided printing), color simplex, black and white duplex (two-sided printing), and color duplex printing devices. FIG. 6D illustrates that report 686 indicates:

in the month of "June 2015", respective black and white simplex, color simplex, black and white duplex, and color duplex printing devices respectively printed about 350,000 pages, about 25,000 pages, about 37,500 pages, and about 12,500 pages, and cumulatively included about 425,000 pages;

in the month of "July 2015", respective black and white simplex, color simplex, black and white duplex, and color duplex printing devices respectively printed about 237,500 pages, about 75,000 pages, about 25,000 pages, and about 12,500 pages, and cumulatively printed about 350,000 pages;

in the month of "August 2015", respective black and white simplex, color simplex, black and white duplex, and color duplex printing devices respectively printed about 362,500 pages, about 12,500 pages, about 112,500 pages, and about 25,000 pages, and cumulatively printed about 512,500 pages;

in the month of "September 2015", respective black and white simplex, color simplex, black and white duplex, and color duplex printing devices respectively printed about 387,500 pages, about 50,000 pages, about 25,000 pages, and about 7,500 pages, and cumulatively printed about 470,000 pages; and in the month of "October 2015", respective black and white simplex, color simplex, black and white duplex, and color duplex printing devices respectively printed about 375,000 pages, about 62,500 pages, about 37,500 pages, and about 20,000 pages and cumulatively printed about 495,000 pages.

Top 10 device usage report 688 can present information about the ten printing devices that were most frequently used in the last month. FIG. 6D illustrates that report 688 includes information for each of the ten printing devices that were most frequently used in the last month, where the information includes: a name of the printing device, a device number for the printing device, an asset number for the printing device, a total number of pages printed by the printing device during the last month, a number of pages printed by the printing device in color during the last month, and a number of pages printed by the printing device in black and white during the last month.

Inactive devices report 690 can present information about zero or more printing devices that were inactive in the last month, where a printing device is determined to be inactive during scenario 600 if the printing device printed less than 300 pages in the last month. In other scenarios, different criteria for inactivity can be used; e.g., a different number of pages printed per month (or other time period), a minimum amount of time or percentage of time spent idle and/or offline.

FIG. 6D illustrates that report 690 includes information for each inactive printing device, where the information includes a name of the inactive printing device, a device number for the inactive printing device, an asset number for the inactive printing device, a total number of pages printed by the inactive printing device during the last month, a number of pages printed by the inactive printing device in color during the last month, and a number of pages printed by the inactive printing device in black and white during the last month.

Last month jams by model report 694 can present information about per-brand percentages of jams over the last month. FIG. 6D shows that report 694 includes a doughnut chart indicating that printing devices of respective brands "1", "2", "3", "4", and "5" respectively had 35%, 25%, 20%, 11%, and 9% of all jams during the last month.

Monthly jam report 696 can present information about monthly numbers of jams. FIG. 6D shows that report 696 includes a line graph with markers indicating that, during the respective months of "June 2015", "July 2015", "August 2015", "September 2015", and "October 2015", the assessed printing devices cumulatively had 127, 119, 137, 92, and 157 respective jams.

Top 10 jammed devices report 698 can present information about the ten printing device that were most frequently jammed in the last month. FIG. 6D illustrates that report 698 includes information for each of the ten printing devices that were most frequently jammed in the last month, where the information includes a name of the printing device, a device number for the printing device, an asset number for the inactive printing device, and a number of jams experienced by the printing device during the last month.

In other scenarios, more, fewer, and/or different analyses, reports, views, and/or data can be provided, presented, and/or displayed by dashboard 680.

IV. Example Methods of Operation

Figure 7:
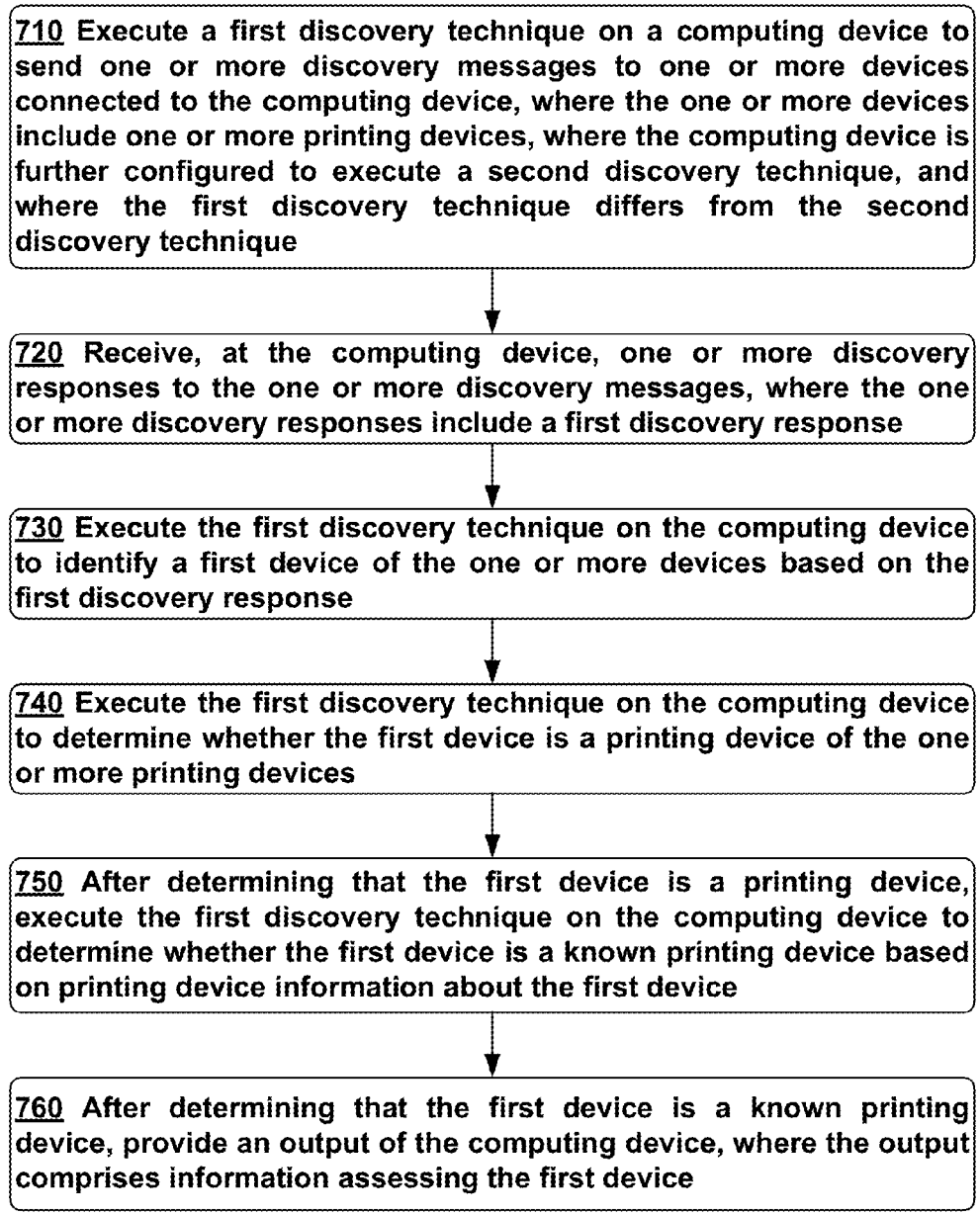
FIG. 7 shows a flowchart for a method, according to an example embodiment.

FIG. 7 shows a flowchart for method 700, according to an example embodiment. Method 700 can be carried out by a computing device executing assessment software, such as assessment device 110 and/or computing device 200 executing assessment software 112. The computing device and/or the assessment software can include hardware and/or software embodying one or more discovery techniques and/or one or more data collection techniques.

Method 700 can begin at block 710, where the computing device can execute a first discovery technique to send one or more discovery messages to one or more devices connected to the computing device. The one or more devices can include one or more printing devices. The computing device can be further configured to execute a second discovery technique, and where the first discovery technique differs from the second discovery technique, such as discussed above in the context of at least FIGS. 2-5H. In some embodiments, at least one discovery message of the one or more discovery messages is a message utilizing a Simple Network Management Protocol, such as discussed above in the context of at least FIG. 2.

At block 720, the computing device can receive one or more discovery responses to the one or more discovery messages, where the one or more discovery responses can include a first discovery response, such as discussed above in the context of at least FIGS. 2-5H.

At block 730, the computing device can execute the first discovery technique to identify a first device of the one or more devices based on the first discovery response, such as discussed above in the context of at least FIGS. 2-5H.

At block 740, the computing device can execute the first discovery technique to determine whether the first device is a printing device of the one or more printing devices, such as discussed above in the context of at least FIGS. 2-5H.

In some embodiments, determining whether the first device is a printing device of the one or more printing devices can include determining whether the first device is a potential unknown device, a known printing device, or an unknown printing device, such as discussed above in the context of at least FIGS. 2-5H.

At block 750, the computing device can, after determining that the first device is a printing device, execute the first discovery technique to determine whether the first device is a known printing device based on printing device information about the first device, such as discussed above in the context of at least FIGS. 2-5H. In some embodiments, the printing device information about the first device can include a model name for the first device. In these embodiments, executing the first discovery technique on the computing device to determine whether the first device is a known printing device can include: determining whether a particular profile of the one or more device profiles is associated with model name for the first device; and after determining that the particular profile is associated with the model name of the first device, determining that the first device is a known printing device, such as discussed above in the context of at least FIGS. 3A-3C.

At block 760, the computing device can, after determining that the first device is a known printing device, provide an output that includes information assessing the first device, such as discussed above in the context of at least FIGS. 2-5H.

In some embodiments, providing the output can include obtaining printing-device-related information from the first device using a first collection technique, and providing an output that includes at least part of the printing-device-related information about the first device obtained by the first collection technique, such as discussed above in the context of at least FIGS. 2-5H. In particular embodiments, providing the output can include: after determining that the first device is not a known printing device, executing a second collection technique to obtain the printing-device-related information from the first device, where the first collection technique differs from the second collection technique; and providing an output that includes at least part of the printing-device-related information about the first device obtained by the second collection technique, such as discussed above in the context of at least FIGS. 2-5H.

In other embodiments, the output can include an output related to an assessment of a cost to operate the first device, such as discussed above in the context of at least FIGS. 5A-5H. In still other embodiments, providing an output of the computing device can include: generating one or more communications using the computing device, where the one or more communications are based on a particular profile; sending the one or more communications from the computing device; receiving, at the computing device, one or more responses to one or more communications; and determining the output of the computing device based on the one or more responses, such as discussed above in the context of at least FIGS. 3A-3C.

In some embodiments, method 700 can further include: executing the second discovery technique on the computing device to send one or more second discovery messages to the one or more devices; receiving, at the computing device, one or more second discovery responses to the one or more second discovery messages, where the one or more second discovery responses include a third discovery response; executing the second discovery technique on the computing device to identify a second device of the one or more devices based on the third discovery response; executing the second discovery technique on the computing device to determine whether the second device is a printing device of the one or more printing devices; and after determining that the second device is a printing device, executing the second discovery technique on the computing device to determine whether the second device is an unknown printing device, such as discussed above in the context of at least FIGS. 2-5H. In particular of these embodiments, method 700 can further include: after determining that the second device is not a known printing device, executing a second collection technique on the computing device to obtain the printing-device-related information from the second device; and providing an output of the computing device that includes at least part of the printing-device-related information about the second device, such as discussed above in the context of at least FIGS. 2-5H.

In other embodiments, method 700 can further include: scheduling one or more threads of the computing device using a thread manager executing on the computing device, where the thread manager determines whether resources of the computing device are available to execute the one or more threads on the computing device, such as discussed above in the context of at least FIGS. 3 and 4. In particular of these embodiments, where the one or more threads include at least one thread of: a first thread for executing the first discovery technique for discovering known printing devices; a second thread for executing a first collection technique for obtaining printing-device-related information from known printing devices; a third thread for executing the second discovery technique for discovering unknown printing devices; and a fourth thread for executing a second collection technique for obtaining printing-device-related information from unknown printing devices, where the first collection technique differs from the second collection technique, such as discussed above in the context of at least FIGS. 3A and 4. In even more particular of these embodiments, the thread manager can determine that resources of the computing device are available to execute at least the second thread and the fourth thread, and where the thread manager schedules the one or more threads so that the second thread has a higher priority than the fourth thread, such as discussed above in the context of at least FIGS. 3A and 4.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   executing a first discovery technique on a computing device to send one or more discovery messages to one or more devices connected to the computing device, wherein the one or more devices comprise one or more printing devices, wherein the computing device is further configured to execute a second discovery technique, and wherein the first discovery technique differs from the second discovery technique;
   receiving, at the computing device, one or more discovery responses to the one or more discovery messages, wherein the one or more discovery responses comprise a first discovery response;
   executing the first discovery technique on the computing device to identify a first device of the one or more devices based on the first discovery response;
   executing the first discovery technique on the computing device to determine whether the first device is a printing device of the one or more printing devices;
   after determining that the first device is a printing device, executing the first discovery technique on the computing device to determine whether the first device is a known printing device based on printing device information about the first device; and
   after determining that the first device is a known printing device, providing an output of the computing device, wherein the output comprises information assessing the first device, wherein providing the output comprises:
      obtaining printing-device-related information from the first device using a first collection technique;
      providing an output that comprises at least part of the printing-device-related information about the first device obtained by the first collection technique;
      after determining that the first device is not a known printing device, executing a second collection technique to obtain the printing-device-related information from the first device, wherein the first collection technique differs from the second collection technique; and
      providing an output that comprises at least part of the printing-device-related information about the first device obtained by the second collection technique.

2. The method of claim 1, wherein
   the first collection technique is related to a data collection engine having one or more data collection sub-engines.

3. The method of claim 1, wherein
   the second collection technique is related to a data collection engine having one or more discovery sub-engines.

4. The method of claim 1, further comprising:
   executing the second discovery technique on the computing device to send one or more second discovery messages to the one or more devices;
   receiving, at the computing device, one or more second discovery responses to the one or more second discovery messages, wherein the one or more second discovery responses comprise a third discovery response;
   executing the second discovery technique on the computing device to identify a second device of the one or more devices based on the third discovery response;
   executing the second discovery technique on the computing device to determine whether the second device is a printing device of the one or more printing devices; and
   after determining that the second device is a printing device, executing the second discovery technique on the computing device to determine whether the second device is an unknown printing device.

5. The method of claim 4, further comprising:
   after determining that the second device is not a known printing device, executing the second collection technique on the computing device to obtain the printing-device-related information from the second device; and
   providing an output of the computing device that comprises at least part of the printing-device-related information about the second device.

6. The method of claim 1, further comprising:
   scheduling one or more threads of the computing device using a thread manager executing on the computing device, wherein the thread manager determines whether resources of the computing device are available to execute the one or more threads on the computing device.

7. The method of claim 6, wherein the one or more threads comprise at least one thread of:
   a first thread for executing the first discovery technique for discovering known printing devices;
   a second thread for executing the first collection technique for obtaining printing-device-related information from known printing devices;
   a third thread for executing the second discovery technique for discovering unknown printing devices; and
   a fourth thread for executing the second collection technique for obtaining printing-device-related information from unknown printing devices.

8. The method of claim 7, wherein the thread manager determines that resources of the computing device are available to execute at least the second thread and the fourth thread, and wherein the thread manager schedules the one or more threads so that the second thread has a higher priority than the fourth thread.

9. The method of claim 1, wherein determining whether the first device is a printing device of the one or more printing devices comprises:
   determining whether the first device is a potential unknown device, a known printing device, or an unknown printing device.

10. The method of claim 1, wherein at least one discovery message of the one or more discovery messages is a message utilizing a Simple Network Management Protocol (SNMP).

11. The method of claim 1, wherein the output of the computing device comprises an output related to an assessment of a cost to operate the first device.

12. The method of claim 1, wherein the printing device information about the first device comprises a model name for the first device, and wherein executing the first discovery technique on the computing device to determine whether the first device is a known printing device comprises:
  determining whether a particular profile of the one or more device profiles is associated with model name for the first device; and
  after determining that the particular profile is associated with the model name of the first device, determining that the first device is a known printing device.

13. The method of claim 12, wherein providing an output of the computing device comprises:
  generating one or more communications using the computing device, wherein the one or more communications are based on the particular profile;
  sending the one or more communications from the computing device;
  receiving, at the computing device, one or more responses to one or more communications; and
  determining the output of the computing device based on the one or more responses.

14. A computing device, comprising:
  one or more processors; and
  data storage configured to store computer-readable instructions that, when executed by the one or more processors, cause the computing device to perform tasks comprising:
    executing a first discovery technique to send one or more discovery messages to one or more devices connected to the computing device, wherein the one or more devices comprise one or more printing devices, wherein the computing device is further configured to execute a second discovery technique, and wherein the first discovery technique differs from the second discovery technique;
    receiving one or more discovery responses to the one or more discovery messages, wherein the one or more discovery responses comprise a first discovery response;
    executing the first discovery technique to identify a first device of the one or more devices based on the first discovery response;
    executing the first discovery technique to determine whether the first device is a printing device of the one or more printing devices;
    after determining that the first device is a printing device, executing the first discovery technique to determine whether the first device is a known printing device based on printing device information about the first device; and
    after determining that the first device is a known printing device, providing an output that comprises information assessing the first device, wherein providing the output comprises:
      obtaining printing-device-related information from the first device using a first collection technique;
      providing an output that comprises at least part of the printing-device-related information about the first device obtained by the first collection technique;
      after determining that the first device is not a known printing device, executing a second collection technique to obtain the printing-device-related information from the first device, wherein the first collection technique differs from the second collection technique; and
      providing an output that comprises at least part of the printing-device-related information about the first device obtained by the second collection technique.

15. The computing device of claim 14, wherein
  the first collection technique is related to a data collection engine having one or more data collection sub-engines.

16. The computing device of claim 14, wherein
  the second collection technique is related to a data collection engine having one or more discovery sub-engines.

17. The computing device of claim 14, wherein the tasks further comprise:
  executing the second discovery technique to send one or more second discovery messages to the one or more devices;
  receiving one or more second discovery responses to the one or more second discovery messages, wherein the one or more second discovery responses comprise a third discovery response;
  executing the second discovery technique to identify a second device of the one or more devices based on the third discovery response;
  executing the second discovery technique to determine whether the second device is a printing device of the one or more printing devices; and
  after determining that the second device is a printing device, executing the second discovery technique to determine whether the second device is an unknown printing device.

18. The computing device of claim 17, wherein the tasks further comprise:
  after determining that the second device is not a known printing device, executing the second collection technique to obtain the printing-device-related information from the second device; and
  providing an output comprising at least part of the printing-device-related information about the second device.

19. The computing device of claim 14, wherein the tasks further comprise:
  scheduling one or more threads using a thread manager that determines whether resources of the computing device are available to execute the one or more threads on the computing device; and wherein the one or more threads comprise at least one thread of:
    a first thread for executing the first discovery technique for discovering known printing devices;
    a second thread for executing the first collection technique for obtaining printing-device-related information from known printing devices;
    a third thread for executing the second discovery technique for discovering unknown printing devices; and
    a fourth thread for executing the second collection technique for obtaining printing-device-related information from unknown printing devices.

20. An article of manufacture comprising non-transitory data storage storing at least computer-readable instructions that, when executed by one or more processors of a computing device, cause the computing device to perform tasks comprising:
  executing a first discovery technique to send one or more discovery messages to one or more devices connected to the computing device, wherein the one or more devices comprise one or more printing devices, wherein the computing device is further configured to execute a second discovery technique, and wherein the first discovery technique differs from the second discovery technique;

receiving one or more discovery responses to the one or more discovery messages, wherein the one or more discovery responses comprise a first discovery response;

executing the first discovery technique to identify a first device of the one or more devices based on the first discovery response;

executing the first discovery technique to determine whether the first device is a printing device of the one or more printing devices;

after determining that the first device is a printing device, executing the first discovery technique to determine whether the first device is a known printing device based on printing device information about the first device; and after determining that the first device is a known printing device, providing an output that comprises information assessing the first device wherein providing the output comprises:

obtaining printing-device-related information from the first device using a first collection technique;

providing an output that comprises at least part of the printing-device-related information about the first device obtained by the first collection technique;

after determining that the first device is not a known printing device, executing a second collection technique to obtain the printing-device-related information from the first device, wherein the first collection technique differs from the second collection technique; and providing an output that comprises at least part of the printing-device-related information about the first device obtained by the second collection technique.

* * * * *